(12) United States Patent
Everest

(10) Patent No.: US 12,242,945 B1
(45) Date of Patent: Mar. 4, 2025

(54) APPARATUS AND METHOD FOR PERSONALIZATION OF MACHINE LEARNING MODELS

(71) Applicant: edYou, Los Angeles, CA (US)

(72) Inventor: Michael Everest, Los Angeles, CA (US)

(73) Assignee: edYou Technologies Inc., Los Angeles, CA (US)

( * ) Notice: Subject to any disclaimer, the term of this patent is extended or adjusted under 35 U.S.C. 154(b) by 0 days.

(21) Appl. No.: 18/381,034

(22) Filed: Oct. 17, 2023

(51) Int. Cl.
    *G10L 15/16*     (2006.01)
    *G06N 3/044*     (2023.01)

(52) U.S. Cl.
    CPC .................................... *G06N 3/044* (2023.01)

(58) Field of Classification Search
    CPC . G10L 15/16; G10L 15/1815; G10L 15/1822; G10L 15/19; G10L 15/22; G10L 15/30; G10L 2015/223; G10L 13/027; G10L 13/033; G10L 13/047; G06F 40/205; G06F 40/253; G06F 40/268; G06F 40/284; G06F 40/30
    See application file for complete search history.

(56) References Cited

U.S. PATENT DOCUMENTS

| | | | |
|---|---|---|---|
| 10,853,717 B2 | 12/2020 | Abramson | |
| 11,574,186 B2 * | 2/2023 | Lyoob | G06F 18/24 |
| 11,595,202 B1 * | 2/2023 | Stewart | H04L 9/50 |
| 11,600,267 B2 * | 3/2023 | Orkin | G10L 15/1815 |
| 11,861,778 B1 * | 1/2024 | Donnell | H04L 51/10 |
| 11,893,166 B1 * | 2/2024 | Tran | A63F 13/211 |
| 11,935,170 B1 * | 3/2024 | Jain | G06F 40/20 |
| 2013/0109002 A1 * | 5/2013 | Howard | G10L 15/16 434/350 |
| 2020/0020038 A1 * | 1/2020 | Haile | G06F 18/24 |
| 2020/0302263 A1 | 9/2020 | Douek | |
| 2020/0302296 A1 * | 9/2020 | Miller | G06F 18/24 |
| 2020/0395008 A1 | 12/2020 | Cohen | |
| 2021/0241650 A1 * | 8/2021 | Schlesinger | G10L 15/22 |
| 2022/0414166 A1 * | 12/2022 | Juravicius | G06F 18/24 |
| 2023/0163987 A1 * | 5/2023 | Young | G06F 3/167 345/419 |
| 2024/0046541 A1 * | 2/2024 | Shirai | G06T 19/003 |

* cited by examiner

*Primary Examiner* — Abdelali Serrou
(74) *Attorney, Agent, or Firm* — Caldwell Intellectual Property Law

(57) ABSTRACT

An apparatus for personalization of machine learning models, the apparatus including at least a processor and a memory communicatively connected to the at least a processor, the memory containing instructions configuring the processor to receive resource data from one or more data acquisition systems, classify the resource data to one or more information categorizations, generate information training data as a function of the classification, train an information machine learning model as a function of the information training data. receive a data request as a function of user input and generate an information output as a function of the data request and the information machine learning model.

20 Claims, 9 Drawing Sheets

APPARATUS AND METHOD FOR PERSONALIZATION OF MACHINE LEARNING MODELS

FIELD OF THE INVENTION

The present invention generally relates to the field of machine learning. In particular, the present invention is directed to personalization of machine learning models.

BACKGROUND

Current machine learning systems lack the proper structure to output data that is specific to user. In addition current machine learning system lack the proper structure to personalize machine learning models to contain training data that is specific to the user.

SUMMARY OF THE DISCLOSURE

In an aspect, an apparatus for personalization of machine learning models is described. The apparatus includes at least a processor and a memory communicatively connected to the at least a processor. The memory contains instructions configuring the processor to receive resource data from one or more data acquisition systems, classify the resource data to one or more information categorizations, generate information training data as a function of the classification, train an information machine learning model as a function of the information training data. receive a data request as a function of user input and generate an information output as a function of the data request and the information machine learning model.

In another aspect, a method for personalization of machine learning models is described. The method includes receiving, by at least a processor, resource data from one or more data acquisition systems, classifying, by the at least a processor, the resource data to one or more information categorizations, generating, by the at least a processor, information training data as a function of the classification, training, by the at least a processor, an information machine learning model as a function of the information training data, receiving, by the at least a processor, a data request as a function of user input and generating, by the at least a processor, an information output as a function of the data request and the information machine learning model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for personalization of machine learning models. In one or more embodiments, apparatus includes data acquisition systems configured to receive resource data. In one or more embodiments, resource data may be used to generate information training data in order to create personalized outputs, such as information outputs.

Aspects of the present disclosure can be used to generate outputs that are specific to a user or entity. Aspects of the present disclosure can also be used to generate user specific output using large language models. This is so, at least in part, because of an information module that is responsible for transforming data requests into personalized outputs. Exemplary embodiments illustrating aspects of the present disclosure are described below in the context of several specific examples.

Figure 1:
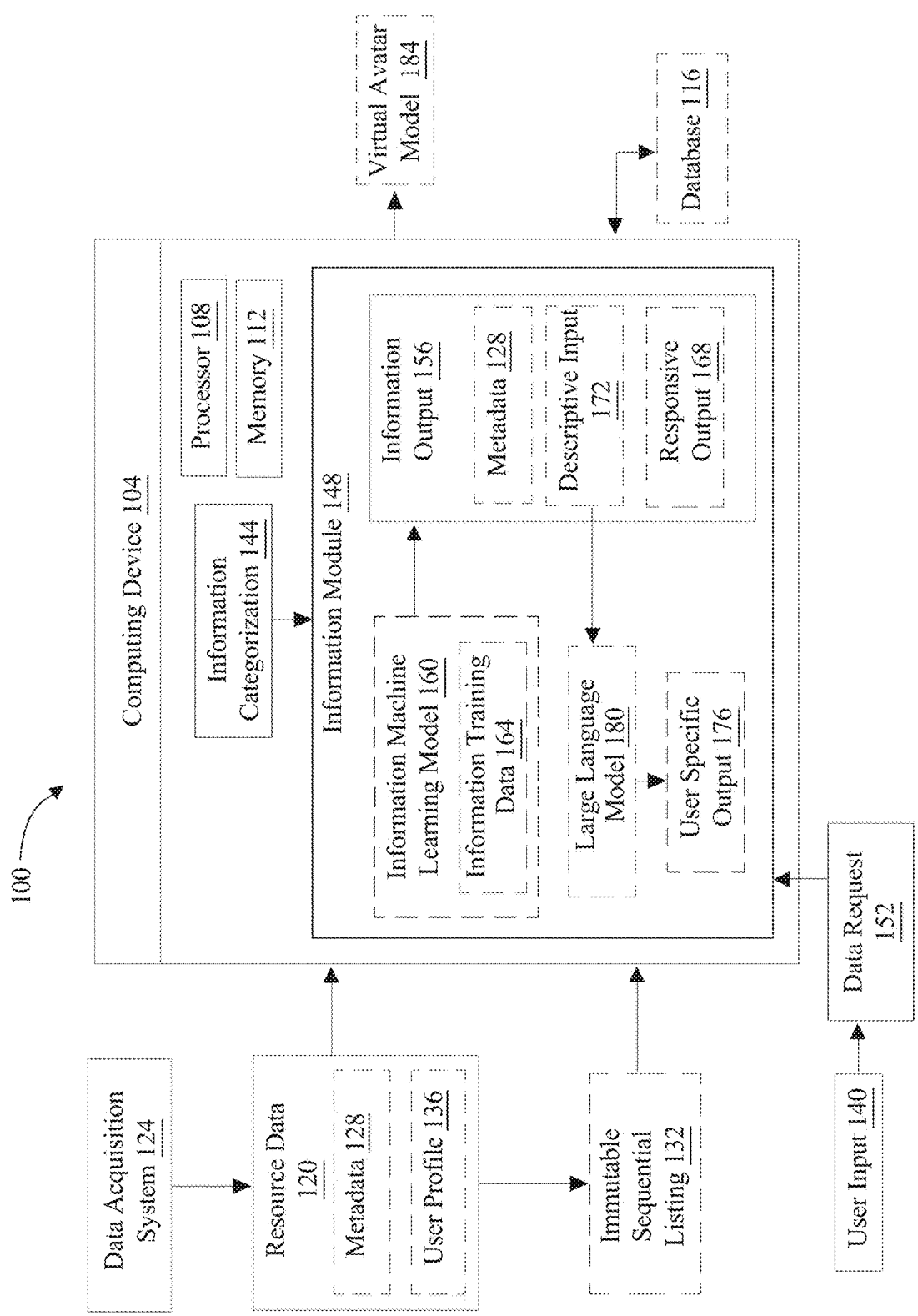
FIG. 1 is a block diagram of an exemplary embodiment of an apparatus for personalization of machine learning models.

Referring now to FIG. 1, in an embodiment, apparatus 100 and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, apparatus 100 and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and continuing to refer to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Further referring to FIG. 1, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, apparatus 100 for personalization of machine learning models is described. Apparatus 100 includes a computing device 104. Apparatus 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, processor 108 is configured to receive resource data 120 from one or more data acquisition systems 124. "Resource data" for the purposes of this disclosure is any user specific information that can be used to gain an informative understanding of one or more areas of interest. For example, resource data 120 may include a digital book such as a biology textbook, a mathematics textbook, a history textbook and the like wherein information contained within the textbooks may be used to gain an informative understanding of their respective topics. "User specific information" for the purposes of this disclosure is information that is associated with a user of apparatus 100. For example, user specific information may include notes a user took, an audio or video meeting associated with the user, a seminar associated with the user and the like. In one or more embodiments, resource data 120 may include a plurality of information such as but not limited to, information associated with biology, information associated with medicine, information associated with law, information associated with history, information associated with patents, and/or any other information that may be used to gain an informative understanding of one or more topics. In one or more embodiments, resource data 120 may include information which may be used to generate a teaching curriculum. "Teaching curriculum" for the purposes of this disclosure is a guide on how a particular set of information will be taught. For example, teaching curriculum may include a set of questions and answers on a topic such as mathematics. In some cases, teaching curriculum may include information in an organized manner wherein a first set of information is first introduced and/or taught, then a second set of information is introduced and/or taught. In one or more embodiments, teaching curriculum may include data visualized in various formats, such as but not limited to, quest and answer, multiple choice, digital flash cards, true and false and the like. In one or more embodiments, a teaching curriculum may include objectives, assignments, due dates associated with assignments and the like.

With continued reference to FIG. 1, resource data 120 may include information that is specific to an entity. "Entity" for the purposes of this disclosure is an organization comprised of one or more persons with a specific purpose. An entity may include a corporation, organization, business, group one or more persons, and the like. In one or more embodiments, information that is specific to an entity may include financial documents, customers surveys, internal reports generated by the entity, any documents generated and/or associated with the entity, recorded video calls associated with the entity, recorded audio calls associated with the entity, conversations between two agents of the entity, conversations between an agent of the entity and another individual and the like. In one or more embodiments, information specific to an entity may include market research on a particular field, any data stored on a database 116 associated with entity, and the like.

With continued reference to FIG. 1, in one or more embodiments, resource data 120 may include metadata 128. "Metadata" for the purposes of this disclosure is information relating to the source of one or elements within resource data 120. For example, resource data 120 containing information about biology may contain metadata 128 indicating that the source of the biology information was retrieved from a biology textbook. In one or more embodiments, metadata 128 may include the identifying source of the information. The identifying source of the information may include, but is not limited to, the website the information was retrieved from, the server and/or database 116 the information was retrieved from, the author who generated the information, the name of the textbook (if any), the publishers (if any), the date the information was published and/or released, the sources cited within the information, the database 116 the information was retrieved from, the website in which the information was retrieved, information associated with the particular individual who uploaded the information and the like. In one or more embodiments, metadata 128 may include one or more options to retrieve the original source of the information within resource data 120. This may include but is not limited to a hyperlink or weblink that can direct an individual to the source of the information, and/or information allowing a user to be directed to the source of the information. In one or more embodiments, resource data 120 may be stored and/or secured on an immutable sequential listing wherein the resource data 120 cannot be tampered with. In one or more embodiments, metadata 128 may include the source of the resource data 120 on the immutable sequential listing 132. In one or more embodiments, location of resource data 120 on an immutable sequential listing 132 may allow for preservation of the original information contained within resource data 120.

With continued reference to FIG. 1, resource data 120 may include user input information. "User input information" for the purposes of this disclosure is information that is input by a user. "User" for the purposes of this disclosure is an individual who will be interacting and/or using apparatus 100. User may include a student, a teacher, an employee of an entity, an agent of the entity and/or any other individual interested in obtaining informative information. "User input" for the purposes of this disclosure is any information received by computing device 104 from a user through one or more input devices. In one or more embodiments, user input information may include notes a user may have taken during an educational course, notes a user during a business meeting, useful documents that a user had on their possession and/or any other educational information that has been input by a user. In one or more embodiments, user input information may be received by a remote device, such as but not limited to, a smartphone, a laptop, a desktop computer and/or any other computing systems. In one or more embodiments, user input information may include written notes by employees of an entity during the course of business, written information by employees during a meeting and the like.

With continued reference to FIG. 1, resource data 120 may include a user profile 136. "User profile" for the purposes of this disclosure is information pertaining to a user and their interactions with apparatus 100. In one or more embodiments, database 116 may be populated with a plurality of user profiles 136 wherein each user profile 136 is associated with a differing user. In one or more embodiments, resource data includes user profile specific to a particular user, such as the current individual interacting with apparatus. In one or more embodiments, user profile 136 may include but is not limited to, the age of the user, the geographical location of the user, the gender of the user and the like. In one or more embodiments, user profile 136 may include the educational background of a user, such as but not limited to, school attended, schools graduated, grades associated with the educational courses that the user attended, current educational courses the user is in, upcoming educational courses the user will be attending, previous exams taken, grades associated with previous exams taken, and the like. In one or more embodiments, user profile 136 may include information associated with previous interactions a user had with apparatus 100. Previous interactions may include, but are not limited to, inputs made by the user, outputs generated by apparatus 100 as a function of user inputs 140 140, and the like. In one or more embodiments, user profile 136 may include a dialect spoken by user. In one or more embodiments, user profile 136 may include words not understood by the user. In one or more embodiments, user profile may include educational topics that a user is proficient in, and/or educational topics that a user is lacking. In one or more embodiments, user profile 136 may include preferences in which a user desires to receive outputs from apparatus 100. For example, user profile 136 may include a preference to receive outputs in a question-and-answer format, outputs in a multiple-choice format and the like. In one or more embodiments, user profile 136 may include any data as indicated by user data in Non-provisional application Ser. No. 18/122,340 filed on Mar. 16, 2023 and entitled "APPARATUS AND METHOD FOR GENERATING AN EDUCATIONAL ACTION DATUM USING MACHINE-LEARNING" the entirety of which is incorporated herein by reference.

With continued reference to FIG. 1, in some embodiments, user profile 136 may include virtual activity data pertaining to user. As used in this disclosure, "virtual activity data" is data related to one or more virtual actions, wherein the virtual action is an action performed by user in a virtual environment. As used in this disclosure, a "virtual environment" is a digital environment which allows users to interact with it and elements/devices thereof within the virtual environment digitally. In some embodiments, virtual environment may be one of a computer system, computer network, and the like. In a non-limiting example, virtual environment may include a user device such as a tablet, laptop, desktop, smart phone and the like connected to network. In some embodiments, virtual environment may also include any electronically based elements associated with the virtual environment, as described in this disclosure. In a non-limiting example, virtual environment may include computer programs, data, data stores, and the like thereof. In some cases, virtual environment may be local to processor 108; for instance, and without limitation, virtual environment may be generated and hosted by processor 108 locally in a single computing device 104. In other cases, virtual environment may be remote to processor 108; for instance, virtual environment may be connected to the processor 108 by a network. Virtual environment may employ any type of network architecture. For example, and without limitation, virtual environment may employ a peer to peer (P2P) architecture where each computing device 104 in a computing network is connected with every computing device 104 in the network and every computing device 104 acts as a server for the data stored in the computing device 104. In a further exemplary embodiment, virtual environment may also employ a client server architecture where a computing device 104 is implemented as a central computing device 104 (e.g., server) that is connected to each client computing device 104 and communication is routed through the central computing device 104. However, the network architecture is not limited thereto. One skilled in the art, after having reviewed the entirety of this disclosure, will recognize the various network architectures that may be employed by the virtual environment. In other embodiments, any network topology may be used. In a non-limiting example, virtual environment may employ a mesh topology where a computing device 104 is connected to one or multiple other computing devices 104 using point to point connections. However, the network topology is not limited thereto. One skilled in the art, after having reviewed the entirety of this disclosure, will recognize the various network architectures that may be employed by the virtual environment. In a non-limiting example, virtual activity data may be received, by processor 108, from virtual environment. Data related to user's activity in virtual environment such as, without limitation, online browsing, online shopping, social media posting, and the like may be collected by processor 108 as user profile 136.

With continued reference to FIG. 1, in some embodiments, virtual environment may include a cloud environment. As used in this disclosure, a "cloud environment" is a set of systems and/or processes acting together to provide services in a manner that is dissociated with underlaying hardware and/or software within apparatus 100 used for such purpose and includes a cloud. A "cloud," as described herein, refers to one or more servers that are accessed over the internet. In some cases, cloud may include Hybrid Cloud, Private Cloud, Public Cloud, Community Cloud, any cloud defined by National Institute of Standards and Technology (NIST), and the like thereof. In some embodiments, cloud may be remote to apparatus 100; for instance, cloud may include a plurality of functions distributed over multiple locations external to apparatus 100. Location may be a data center, such as data store described in further detail below. In some embodiments, cloud environment may include implementation of cloud computing. As used in this disclosure, "cloud computing" is an on-demand delivery of information technology (IT) resources within a network through internet, without direct active management by user. In some embodiment, without limitation, cloud computing may include a Software-as-a-Service (SaaS). As used in this disclosure, a "Software-as-a-Service" is a cloud computing service model which make software available to the user using apparatus 100 directly; for instance, SaaS platform may provide partial or entire set of functionalities of apparatus 100 to user without direct installation of the entire set of functionalities. In a non-limiting example, virtual activity data may include data related to a user input 140 and/or corresponding received response from one or more clouds; for instance, and without limitation, processor 108 may receive a collection of user inputs 140 and/or corresponding response data contained in response body from one or more SaaS platforms as user profile 136. In another non-limiting example, virtual activity data may include one or more documents created, modified, and/or otherwise saved by users in one or more clouds; for instance, and without limitation, electronic files stored in MICROSOFT 365, DROPBOX, G SUITE, and the like by the user. Processor 108 may extract user data from such documents using optical character recognition (OCR) as described below in this disclosure.

With continued reference to FIG. 1, in some embodiments, receiving the user profile 136 may include receiving virtual activity data from a virtual avatar model operated by the user. As used in this disclosure, a "virtual avatar model" is a component configured to generate, operate, and manage a virtual avatar based on user's command. A "virtual avatar," as used in this disclosure is defined as an interactive character or entity in a virtual environment. In a non-limiting example, virtual avatar may include a virtual representation of the user in virtual environment. In an embodiment, a virtual avatar may be customizable. Virtual avatar may include, without limitation, an animal, human, robot, inanimate object, and the like, and may include one or more personalized characteristics, wherein personalized characteristics may be derived from user's behavior and/or activity in virtual environment. In a non-limiting example, virtual environment may include an extended reality space, such as, without limitation, augmented reality (AR) space, virtual reality (VR) space, and/or any other digital realities. For example, and without limitation, extended reality space may include a virtual classroom, virtual meeting room, virtual study room, and the like thereof. Virtual activity data may include data related to the behavior and/or activity of the virtual avatar of virtual avatar model operated by user. User may have a unique study tyle which may be incorporated by virtual avatar of virtual avatar model. For instance, and without limitation, virtual activity data of virtual avatar model may include one or more image files, recorded animation files, and/or video clips that may include one or more files Virtual avatar may include one or more animation files and/or video clips and may include user's study activities indicating user's learning pattern. Virtual avatar and virtual avatar model may include any virtual avatar and virtual avatar model described in U.S. patent application Ser. No. 18/122,198 filed on Mar. 16, 2023 and titled "APPARATUS AND METHOD FOR EDUCATING AN ENTITY USING EXTENDED REALITY," the entity of which is incorporated by reference herein.

With continued reference to FIG. 1, apparatus 100 may include an optical device. As used in this disclosure, an "optical device" is a device that is configured to sense electromagnetic radiation, such as without limitation visible light, and generate an image representing the electromagnetic radiation. In some cases, optical device may include a camera, wherein the camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. In a non-limiting example, optical device may include any device configured to capture visual representation of the user, or the environment surrounding user, from a portable webcam to a high-end camera configured to capture visual representations not visible to human eye, such as, without limitation, infra-red cameras. As used in this disclosure, "image data" is information representing at least a physical scene, space, and/or object. In some cases, user profile 136 and/or resource data 120 may include image data, generated by camera, related to the user. "Image data" may be used interchangeably through this disclosure with "image," where image is used as a noun. An image may be optical, such as without limitation where at least an optic is used to generate an image of an object. In a non-limiting example, optical device may be configured to use at least an optic to generate an image of the user. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image. In other cases, external datum 108 may include video data related to the user, wherein video data is a recording of plurality of images generated by at least an optic.

With continued reference to FIG. 1, in some embodiments, apparatus 100 may include or be communicatively connected to an eye sensor. As used in this disclosure, an "eye sensor" is any system or device that is configured or adapted to detect an eye parameter as a function of an eye phenomenon. In some cases, at least an eye sensor may be configured to detect at least an eye parameter as a function of at least an eye phenomenon. As used in this disclosure, an "eye parameter" is an element of information associated with an eye. Exemplary non-limiting eye parameters may include blink rate, eye-tracking parameters, pupil location, gaze directions, pupil dilation, and the like. Exemplary eye parameters are described in greater detail below. In some cases, an eye parameter may be transmitted or represented by an eye signal. An eye signal may include any signal described in this disclosure. As used in this disclosure, an "eye phenomenon" may include any observable phenomenon associated with an eye, including without limitation focusing, blinking, eye-movement, and the like. In a non-limiting example, eye sensor may include an electromyography sensor. Electromyography sensor may be configured to detect at least an eye parameter as a function of at least an eye phenomenon.

Still referring to FIG. 1, in some embodiments, eye sensor may be embedded within optical device described above. In a non-limiting example, eye sensor may utilize a camera directed toward user's eyes. In some cases, eye sensor may include a light source, likewise directed to user's eyes. Light source may have a non-visible wavelength, for instance infrared or near-infrared. In some cases, a wavelength may be selected which reflects at an eye's pupil (e.g., infrared). Light that selectively reflects at an eye's pupil may be detected, for instance by camera. Images of eyes may be captured by camera of optical device. In some embodiments, optical device may be programmed with Python using a Remote Python/Procedure Call (RPC) library. Optical device may be used to operate computer vision model described below in this disclosure; for instance, and without limitation, optical device may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, for example by way of optical flow detection; detect and decode barcodes; capture images; and record video.

Still referring to FIG. 1, in some cases, optical device with eye sensor may be used to determine eye patterns (e.g., track eye movements). For instance, and without limitation, camera of optical device may capture one or more images of the user and internal/external processor 108 of optical device may process images to track user's eye movements. External processor 108 may include a processor 108 in communication with apparatus 100 as described in further detail below. In some embodiments, a video-based eye tracker may use corneal reflection (e.g., first Purkinje image) and a center of pupil as features to track over time. A more sensitive type of eye-tracker, a dual-Purkinje eye tracker, may use reflections from a front of cornea (i.e., first Purkinje image) and back of lens (i.e., fourth Purkinje image) as features to track. A still more sensitive method of tracking may include use of image features from inside eye, such as retinal blood vessels, and follow these features as the eye rotates. In some cases, optical methods, particularly those based on video recording, may be used for gaze-tracking and may be non-invasive and inexpensive. In a non-limiting example, a relative position between camera of optical device and the user may be known or estimable. Pupil location may be determined through analysis of images (either visible or infrared images). In some cases, camera may focus on one or both eyes and record eye movement as viewer (i.e., user) looks. In some cases, eye sensor embedded within optical device may use center of pupil and infrared/near-infrared non-collimated light to create corneal reflections (CR). A vector between pupil center and corneal reflections can be used to compute a point of regard on surface (i.e., a gaze direction). In some cases, a simple calibration procedure with the user may be needed before using eye sensor. In some cases, two general types of infrared/near-infrared (also known as active light) eye-tracking techniques can be used: bright-pupil (light reflected by pupil) and dark-pupil (light not reflected by pupil). Difference between bright-pupil and dark pupil images may be based on a location of illumination source with respect to optics. For instance, if illumination is coaxial with optical path, then eye may act as a retroreflector as the light reflects off retina creating a bright pupil effect similar to red eye. If illumination source is offset from optical path, then pupil may appear dark because reflection from retina is directed away from camera. In some cases, bright-pupil tracking creates greater iris/pupil contrast, allowing more robust eye-tracking with all iris pigmentation, and greatly reduces interference caused by eyelashes and other obscuring features. In some cases, bright-pupil tracking may also allow tracking in lighting conditions ranging from total darkness to very bright.

Still referring to FIG. 1, additionally, or alternatively, in some cases, a passive light optical eye tracking method may be employed by optical device. Passive light optical eye tracking may use visible light to illuminate user's eyes. In some cases, passive light optical tracking yields less contrast of pupil than with active light methods; therefore, in some cases, a center of iris may be used for calculating a gaze vector. In some cases, a center of iris determination requires detection of a boundary of iris and sclera (e.g., limbus tracking). In some case, eyelid obstruction of iris and our sclera may challenge calculations of an iris center. Further, one or more devices described herein may be head-mounted, some may require user's head to be stable, and some may function remotely and automatically track user's head during motion. Optical device may capture images at frame rate. Exemplary frame rates include 15, 30, 60, 120, 240, 350, 1000, and 1250 Hz.

With continued reference to FIG. 1, user profile 136 may include actual activity data pertaining to the user. As used in this disclosure, "actual activity data" is data related to user's activity in a physical environment. In a non-limiting example, actual activity data includes "real-world" data related to user's activity that is taking place outside virtual environment as described above. In a non-limiting example, actual activity data may include data related to real-world activities such as, without limitation, exercising, playing sport, reading, drawing, studying, and the like performed by the user off-line. In some embodiments, actual activity data may be received from a user profile 136. In one or more embodiments, user profile 136 may include one or more data submissions pertaining to actual activity data. As used in this disclosure, a "data submission" is an assemblage of data provided by the user as an input source. In a non-limiting example, data submission may include user uploading one or more documentations to processor 108, wherein the documentations are sources of information related to user. In some cases, documentation may include electronic document, such as, without limitation, txt file, JSON file, word document, pdf file, excel sheet, image, video, audio, and the like thereof. For instance, and without limitation, electronic document may include electronic transcript, course schedule, homework assignment, and the like thereof. In other cases, documentation may include physical document (i.e., in form of paper) containing data related to user's real-world activity; for instance, and without limitation, such physical documentation may be a certificate awarded by user's educational establishment (i.e., diploma). Physical document may be scanned by processor 108 and data therein may be extracted by processor 108 using OCR as described in further detail above.

With continued reference to FIG. 1, user profile 136 may include educational obstacle datum. As used in this disclosure, an "educational obstacle datum" is an element of data related to difficulties user currently facing that impede user's educational progress. In a non-limiting example, educational obstacle datum may include data related to questions that a user answered incorrectly and/or incompletely during an exam participated in by the user. In another non-limiting example, educational obstacle datum may include a particular activity, task, and/or otherwise exercise that user need practice with and/or improve on. In one or more embodiments, educational obstacle datum may be generated and/or input by a user. In one or more embodiments, a user may input educational obstacle datum into user profile 136. In one or more embodiments, educational obstacle datum may be generated by processor 108. In one or more embodiments, educational obstacle datum may be generated by elements of user profile 136, previous inputs by the user and the like. A generated educational obstacle machine-learning model may be trained by correlated inputs and outputs of training data. Training data may be data sets that have already been converted from raw data whether manually, by machine, or any other method. Training data may include previous outputs such that educational obstacle machine-learning model iteratively produces outputs. Educational obstacle machine-learning model using a machine-learning process may output converted data based on input of training data. In a non-limiting example, generating educational obstacle machine-learning model may include training educational obstacle machine-learning model using educational obstacle training data, wherein the educational obstacle training data may include a plurality of user data sets and/or user profiles 136 correlated to a plurality of educational obstacle data. For example, educational obstacle training data may be used to show user profile 136 may indicate a particular educational obstacle datum. In one or more embodiments, educational obstacle training data may also include a plurality of virtual activity data that are each correlated to one of a plurality of educational obstacle data. In such an embodiment, educational obstacle training data may be used to show how virtual activity data may indicate a particular difficulty user currently facing in education based on virtual activity. In other embodiments, educational obstacle training data may also include a plurality of actual activity data that are correlated to one of a plurality of educational obstacle data. In such an embodiment, educational obstacle training data may be used to show how actual activity data may indicate a particular difficulty user currently facing in education based on actual activity. Processor 108 is configured to determine educational obstacle datum using trained educational obstacle machine-learning model as a function of user profile 136.

With continued reference to FIG. 1, in some embodiments, educational obstacle datum may include at least one educational obstacle category associated with educational obstacle datum. As used in this disclosure, an "educational obstacle category" is a class or division of educational obstacle data. In a non-limiting example, educational obstacle category may be an element of data related to a user's area of difficulty in the user's education. In some embodiments, educational obstacle category may include a subject; for instance, and without limitation, user profile 136 may be categorized by area of learning such as literature, math, chemistry, physics, biology, and the like thereof. In other embodiments, educational obstacle category may include a field in the subject; for instance, and without limitation, subject match may include one or more educational obstacle categories such as algebra, geometry, statistics, and the like thereof. In one or more embodiments, educational obstacle datum may be determined based on at least one educational obstacle category. In some embodiments, processor 108 may be configured to classify user profile 136 into at least one educational obstacle category and filter user profile 136 based on at least one educational obstacle category. For instance, and without limitation, processor 108 may be configured to only examine virtual activity data and/or actual activity data related to math subject and determine educational obstacle datum in field of math pertaining to the user. Such educational obstacle datum may include data indicating user is currently having difficulty in solving differential equations, understanding differentiation rules, and the like. In a further embodiment, educational obstacle machine-learning model 1 may be trained using educational obstacle training data, wherein educational obstacle training data may include a plurality of educational obstacle categories as input correlated to a plurality of educational obstacle data as output. In such embodiment, each educational obstacle category may show a particular educational obstacle datum pertaining to user. Such trained educational obstacle machine-learning model may be configured to take one or more educational obstacle categories and/or user data as input and output educational obstacle datum pertaining to user.

With continued reference to FIG. 1, an educational obstacle classifier may classify user profile 136 into at least one educational obstacle category, which may include any educational obstacle category and/or information categorization as described above. For instance, and without limitation, educational obstacle classifier may receive user data profile such as, without limitation, virtual activity data, actual activity data, and the like, and classify received user profile 136 to an educational obstacle category. Educational obstacle classifier may be trained using training data correlating user data to educational obstacle category. In a non-limiting example, training data used for training educational obstacle classifier may include a plurality of user data sets as input correlated to a plurality of educational obstacle categories as output. Each user profile 136 may show one or more educational obstacle categories user belongs to. Processor 108 may be configured to classify user profile 136 into educational obstacle category using trained educational obstacle classifier and determine educational obstacle datum as a function of the at least one educational obstacle category.

With continued reference to FIG. 1, processor 108 may be configured to generate an educational action datum for the user as a function of the educational obstacle datum. As used in this disclosure, an "educational action datum" is an element of data related to actions user can adopt to eliminate or address educational obstacle datum; In a non-limiting example, educational action datum may include data related to actions that helps to overcome user's educational difficulties specified by educational obstacle datum. In some embodiments, actions may include virtual and/or actual actions. In a non-limiting example, educational action datum may include an online training course that helps user better understanding concepts in a given educational obstacle category of educational obstacle datum. In another non-limiting example, educational action datum may include detailed instructions for user to establish a healthy learning style. In some embodiments, educational action datum may include at least an educational action datum waypoint. As used in this disclosure, an "educational action datum waypoint" is a checkpoint of user's progress on completing educational action datum. In some cases, educational action datum waypoint may include a plurality of educational action datum waypoints; for instance, and without limitation, educational action datum waypoint may include a section, unit, or otherwise a chapter of a training course provided by educational action datum. In some embodiments, at least an educational action datum waypoint may include a user-oriented assignment. As used in this disclosure, a "user-oriented assignment" is a set of user-specific questions targeting educational obstacle datum of the user. In a non-limiting example, user-specific question may include a question asking user "what is the derivative of a given function f(x)" if user is currently struggling at passing exam and quizzes in calculus class. Educational action datum may further include at least a waypoint response associated with at least an educational action datum waypoint. As used in this disclosure, a "waypoint response" is a datum representing a completion of educational action datum waypoint. Model may include a component in communication with virtual avatar in virtual environment.

With continued reference to FIG. 1., processor 108 may determine educational action datum using a using a lookup table. A "lookup table," for the purposes of this disclosure, is an array of data that maps input values to output values. A lookup table may be used to replace a runtime computation with an array indexing operation. In another non limiting example, an educational action datum lookup table may be able to correlate educational obstacle datum to an educational action datum. Processor 108 may be configured to "lookup" one or more educational obstacle datum 1 in order to find a corresponding educational action datum. In some embodiments, educational action datum may be determined by processor 108 based on a plurality of lookup tables; for instance, and without limitation, a lookup table for each educational obstacle category may be initialized by processor 108. Processor 108 may be configured to lookup one or more educational obstacle datum in corresponding lookup tables, determined based on educational obstacle category in order to find a corresponding educational action datum.

With continued reference to FIG. 1, processor 108 may be configured to retrieve user profile 136 of a plurality of user profiles 136 as function of user input 140. In one or more embodiments, processor 108 may be configured to receive a unique identifier from a user. "Unique identifier" for the purposes of this disclosure is a unique set of characters or numbers that may be used to locate user profile 136. In one or more embodiments, unique identifier may include an account number wherein the account number may be used to retrieve user profile 136. In one or more embodiments, unique identifier may include a username and password, wherein each user profile 136 may be associated with a username and password. In one or more embodiments, processor 108 may receive a username and password and search database 116 containing a plurality of user profiles 136 associated with username and passwords having a corresponding match. In one or more embodiments, processor 108 may retrieve a user profile 136 that contains a corresponding match to a unique identifier input by users.

In one or more embodiments, resource data 120 may be retrieved from one or more data acquisition systems 124. "Data acquisition system" for the purposes of this disclosure is software or an algorithm that is used to gather data from various sources. For example, data acquisition system 124 may include a web crawler. A "web crawler," as used herein, is a program that systematically browses the internet for the purpose of web indexing. Web crawler may be seeded with platform URLs, wherein the crawler may then visit the next related URL, retrieve the content, index the content, and/or measures the relevance of the content to the topic of interest. In some embodiments, computing device 104 may generate a web crawler to compile resource data 120 and/or elements thereof. The web crawler may be seeded and/or trained with a reputable website, such as educational websites. Web crawler may be generated by computing device 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract any data suitable for resource data 120. In one or more embodiments, data acquisition system 124 may include one or more data scrapers configured to use application program interfaces (API) for data retrieval. APIs allow applications to communicate with one another. In one or more embodiments, APIs may be used for data retrieval wherein the API facilitates data retrieval. In one or more embodiments, data acquisition system 124 may include a data scraper. A "data scraper" for the purpose of this disclosure is a system that extracts data from one or more websites or databases 116. In contrast to a WebCrawler, a data scraper may be used to capture specific data sets whereas a Web crawler may be used to capture entire webpages. In one or more embodiments, data acquisition system 124 may include an RSS (really simple syndicate) aggregator. "RSS aggregator" for the purposes of this disclosure is a system that is configured to systematically gather data from RSS websites. The RSS aggregator may be configured to retrieve data and store it on database 116. In one or more embodiments, the RSS aggregator may be configured to retrieve resource data 120 and/or any information associated with resource data 120. In one or more embodiments, data acquisition system 124 may include a data scraper configured to retrieve any data stored on database 116. In one or more embodiments, any information input by user and/or any other individuals may be stored on database 116 and retrieved by data scraper. In one or more embodiments, data acquisition system 124 may include a chatbot system. A "chatbot system" for the purposes of this disclosure is a program configured to simulate human interaction with a user in order to receive or convey information. In some cases, chatbot system may be configured to receive resource data 120, elements thereof and any other data as described in this disclosure through interactive questions presented to the user.

With continued reference to FIG. 1, in one or more embodiments, data acquisition system 124 may be configured to retrieve resource data 120. In one or more embodiments, data acquisition system 124 may be configured to retrieve metadata 128 associated with resource data 120.

With continued reference to FIG. 1, data acquisition system 124 may include an optical character reader. In one or more embodiments, a user, a $3^{rd}$ party, an educational institution, an educator and the like may input one or more data files into computing device 104 wherein the one or more data files may be converted to machine readable text. For example, a user may input digital records and/or scanned physical documents that have been converted to digital documents, wherein data set 120 may include data that have bene converted into machine readable text. In some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4, 5, and 6.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 108 may be configured to convert resource data 120 into textual data. "Textual data" for the purposes of this disclosure is information in written format. In contrast to audio communications or an image, textual data may include information within a written format. In one or more embodiments, processor 108 may be configured to receive one or more audio signals within resource data 120. An "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively or additionally, audio signal may include a digital signal of time-varying digital numbers. In some cases, a digital audio signal may be communicated (e.g., transmitted and/or received) by way of any of an optical fiber, at least an electrically transmissive path, and the like. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Audio signals may represent frequencies within an audible range corresponding to ordinary limits of human hearing, for example substantially between about 20 and about 20,000 Hz. According to some embodiments, an audio signal may include one or more parameters, such as without limitation bandwidth, nominal level, power level (e.g., in decibels), and potential level (e.g., in volts). In some cases, relationship between power and potential for an audio signal may be related to an impedance of a signal path of the audio signal. In some cases, a signal path may single-ended or balanced. In one or more embodiments, microphone may be configured to transduce an environmental noise to an environmental noise signal. In some cases, environmental noise may include any of background noise, ambient noise, aural noise, such as noise heard by a user's ear, and the like. Additionally or alternatively, in some embodiments, environmental noise may include any noise present in an environment, such as without limitation an environment surrounding, proximal to, or of interest/disinterest to a user. Environmental noise may, in some cases, include substantially continuous noises, such as a drone of an engine. Alternatively or additionally, in some cases, environmental noise may include substantially non-continuous noises, such as spoken communication or a backfire of an engine. Environmental noise signal may include any type of signal, for instance types of signals described in this disclosure. For instance, an environmental noise signal may include a digital signal or an analog signal.

With continued reference to FIG. 1, in one or more embodiments where resource data 120 includes audio data, processor 108 may convert audio data into textual data. In one or more embodiments, audio data may include audio signals. In one or more embodiments, processor 108 may include one or more speech to text systems wherein the system is configured to receive speech in the form of audio signals and/or audio data and convert the speech into textual data. In one or more embodiments, processor 108 may include automatic speech recognition. "Automatic speech recognition" for the purposes of this disclosure is a system configured to convert speech into text. In some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by computing device 104. Computing device 104 may then train an automatic speech recognition model according to training data which includes audible verbal content correlated to known content. In this way, computing device 104 may analyze a person's specific voice and train an automatic speech recognition model to the person's speech, resulting in increased accuracy. Alternatively or additionally, in some cases, computing device 104 may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighed by their estimated probability. In some cases, an employed loss function may include Lowenstein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 4-6. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. Neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, in one or more embodiments, processor 108 is configured to classify resource data 120 to one or more information categorizations 144. "Information categorization," for the purposes of this disclosure, is a grouping of data that is associated with the same or similar topics. For example, information categorization 144 may include medicine, history, and the like. In one or more embodiments, information categorization 144 may include a grouping of elements within resource data 120 such as but not limited to, employee communications, the finances of the entity, the client feedback of the entity, the background information of the entity, market research, and the like. In one or more embodiments, information categorizations 144 may further include but are not limited to, technology, history, medicine, law, orthodontics, surgery, mathematics, accounting, English literature, English grammar, languages, engineering and the like. In one or more embodiments, information categorization 144 may further include grouping of data with user profile 136 such as but not limited to, groupings related to personal information about the user, groupings associated with the user's virtual activity, groupings associated with eh user's physical activity, groupings associated with educational topics associated with the user and the like. In one or more embodiments, each information categorization 144 may include a subcategorization, wherein the subcategorization is a specific category within the information categorization 144. For example, information categorization 144 of law may include subcategorizations such as, but not limited to, patent law, criminal law, product liability, torts, medical malpractice and the like. Similarly, an information categorization 144 of medicine may include subcategorizations such as medications, surgery, orthopedics, dentistry, chemotherapy and the like. In one or more embodiments, sub categorizations may be used to categorize resource data 120 into smaller data sets that may allow for quicker processing of data. In one or more embodiments, computing device 104 may be configured to generate subcategorizations in situations wherein data classified to information categorization 144 reaches a data threshold. "Data threshold" for the purposes of this disclosure is a predetermined threshold of a storage size of a data set. In one or more embodiments, data sets containing a larger storage size than data threshold may require longer processing due to the vast amount of data that needs to be processed. In one or more embodiments, computing device 104 may be configured to generate additional subcategorizations when data classified to a particular information categorization 144 reaches data threshold. In one or more embodiments, subcategorization may allow for the generation of smaller data sets that may be used for processing.

With continued reference to FIG. 1, a "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. In some cases, processor 108 may generate and train an information classifier configured to receive resource data 120 and output one or more information categorizations 144. Processor 108 and/or another device may generate a classifier using a classification algorithm, defined as a process whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. An information classifier may be trained with training data correlating resource data 120 to information categorizations 144. Training data may include a plurality of resource data 120 correlated to a plurality of information categorizations 144. In an embodiment, training data may be used to show that a particular element within resource data 120 may be correlated to a particular information categorization 144. "Element" for the purposes of this disclosure refers to a portion of a whole. For example, an element of resource data 120 may include portions of resource data 120, such as but not limited to, a word, a phrase, a document, a grouping of information classified to the same categorization and the like. Training data may be received from an external computing device 104, input by a user, and/or previous iterations of processing. An information classifier may be configured to receive as input and categorize elements of resource data 120 to one or more information categorizations 144. In some cases, processor 108 and/or computing device 104 may then select any elements of resource data 120 containing a similar label and/or grouping and group them together. In some cases, resource data 120 may be classified using a classifier machine learning model. In some cases classifier machine learning model may be trained using training data correlating a plurality of resource data 120 correlated to a plurality of information categorizations 144. In an embodiment, a particular element within resource data 120 may be correlated to a particular information categorization 144. In some cases, classifying resource data 120 may include classifying resource data 120 as a function of the classifier machine learning model. In some cases, classifier training data may be generated through input by a user. In some cases, classifier machine learning model may be trained through user feedback wherein a user may indicate whether a particular element corresponds to a particular class. In some cases, classifier machine learning model may be trained using inputs and outputs based on previous iterations. In one or more embodiments, information classifier may classify element of resource data 120 to one or more subcategorizations. In one or more embodiments, elements of resource data 120 may be classified to subcategorization in instances where a particular information categorization 144 contains sufficient data to warrant classification of resource data 120 to one or more subcategorizations. In one or more embodiments, an information categorization 144 may contain a large grouping of elements wherein the grouping may be broken up into subcategorizations in order to improve the classification of resource data 120. In one or more embodiments, classification machine learning model may be trained to generate subcategorizations and classify elements of resource data 120 to subcategorizations. In one or more embodiments, classifier machine learning model may be configured to generate subcategorizations when a particular threshold of data has been reached with respect to a particular information categorization 144. In one or more embodiments, classifier machine learning model may be trained to find commonalities between elements within an information categorization and generate a subcategorization based on the commonalities. For example, and without limitation, an information categorization 144 associated with biology may contain similar elements describing plants wherein classifier machine learning model may be configured to generate a subcategorization associated with plants. In one or more embodiments, classifier machine learning model may be trained to further group elements within an information categorization 144 to one or more subcategorizations. In one or more embodiments, classifier machine learning model may be configured to generate subcategorization in instances when only a portion of elements within an information categorization 144 may contain commonalities. In one or more embodiments, training data used to train classifier machine learning model may include training data containing a plurality of resource data 120 and/or a plurality of classified resource data correlated to a plurality of subcategorizations. In one or more embodiments, training data may be used to train classifier machine learning model to generate subcategorizations.

With continued reference to FIG. 1, computing device 104 and/or processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors' algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in one or more embodiments, processor 108 may configure to generate an information module 148. "Information module" for the purposes of this disclosure is a system that receives one or more inputs, such as data request 152 and generates outputs such as information outputs 156 using resource data 120. For example, and without limitation, information module 148 may receive inputs and output elements of resource data 120. In one or more embodiments, information module 148 may receive inputs and output data that has been modified by resource data 120. For example, and without limitations, an output of information module 148 may differ based on the content of resource data 120. Continuing, an input discussing finances may differ in instances wherein resource data 120 contains information associated with finances. In one or more embodiments, information module 148 may receive inputs and personalize the inputs based on resource data 120 and/or user profile 136 to be fed into one or more machine learning models as will be described in further detail below.

With continued reference to FIG. 1, information module 148 may include an information machine learning model 160. In one or more embodiments, processor 108 is configured to generate an information machine learning model 160 as a function of the resource data 120. "Information machine learning model" for the purposes of this disclosure is a machine learning model that is configured to receive an input and output corresponding information associated with the input. For example, the input may include a prompt such as "what is the average income for each employee last year" wherein an output may contain questions and answers associated with the finances of an entity that may be within resource data 120. In one or more embodiments, information machine learning model 160 may generate outputs as a function of inputs received. In one or more embodiments, outputs may include elements of resource data 120. In one or more embodiments, outputs of information machine learning model 160 may include outputs that have been modified as a function of resource data 120.

In one or more embodiments, processor 108 may use a machine learning module, such as an information machine learning module for the purposes of this disclosure, to implement one or more algorithms or generate one or more machine-learning models, such as information machine learning model 160, to generate outputs. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or be provided by a user. In other embodiments, a machine-learning module may obtain a training set by querying a communicatively connected database 116 that includes past inputs and outputs. Training data may include inputs from various types of databases 116, resources, and/or user inputs 140 and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as information machine learning module may be used to create information machine learning model 160 and/or any other machine learning model using training data. Information machine learning model 160 may be trained by correlated inputs and outputs of training data. Training data may be data sets that have already been converted from raw data whether manually, by machine, or any other method. Information training data 164 may be stored in database 116. Information training data 164 may also be retrieved from database 116. In some cases information machine learning model 160 may be trained iteratively using previous inputs correlated to previous outputs. For example, processor 108 may be configured to store outputs from a current iteration and to train the machine learning model. In some cases, the machine learning model may be trained based on user input 140. For example, a user may indicate that information that has been output is inaccurate wherein the machine learning model may be trained as a function of the user input 140. In some cases, the machine learning model may allow for improvements to computing device 104 such as but not limited to improvements relating to comparing data items, the ability to sort efficiently, an increase in accuracy of analytical methods and the like.

With continued reference to FIG. 1, information module 148 and/or information machine learning model 160 receive inputs such as data requests 152 and generate outputs such as information outputs 156. "Data request" for the purposes of this disclosure is an input made by user which contains information associated with a request to obtain data. For example, data request 152 may include a request to obtain information about an entity, a particular subject and the like. In one or more embodiments, data request 152 may include a request to receive information associated with resource data 120. In one or more embodiments, data request 152 may include a request to receive an output that can be fed into other machine learning models, wherein the outputs is associated with resource data 120. For example, and without limitation, data request 152 may include a request to receive information about a particular subject wherein user profile 136 and/or resource data 120 may be used to modify the request and generate an output that can be input into one or more machine learning models. In one or more embodiments, data request 152 may be generated and/or received as a function of user input 140 such as any user input 140 as described in this disclosure. In one or more embodiments, data request 152 may include a request to receive information contained within resource data 120. For example, and without limitation, data request 152 may include a request to receive financial documents in instances wherein resource data 120 includes financial documents.

With continued reference to FIG. 1, "Information output" for the purposes of this disclosure is an output of one or more machine learning models that are associated with data request 152. For example, and without limitation, information output 156 may include information about biology in instances where data request 152 contains a request to obtain information about biology. Similarly, information output 156 may include data associated with a company's finances in instances in which data request 152 contains a request to receive information associated with finances. In one or more embodiments, information output 156 may include unique outputs that have been generated based on resource data 120. In one or more embodiments, information outputs 156 may include data requests 152 that have been modified to be input into one or more machine learning models. For example, and without limitation, information output 156 may include an input that is to be received by differing machine learning model wherein the input is personalized based on the resource data 120 received. For example, information output 156 may include elements of user profile 136 and/or resource data 120 wherein the elements may be used to narrow outputs generated by other machine learning models. In one or more embodiments, information output 156 may include a personalized input into a machine learning model wherein the personalized input contains elements of resource data 120 and/or user profile 136. In one or more embodiments, information outputs 156 may include elements of resource data 120.

In one or more embodiments, information module 148 and/or information machine learning model 160 may include information training data 164 containing a plurality of data requests 152 correlated to a plurality of information outputs 156. In one or more embodiments, processor 108 may use resource data 120 to generate information training data 164. In one or more embodiments, data requests 152 may include inputs into the machine learning model. In one or more embodiments, data requests 152 may be received by a user, processor 108 and/or another computing device 104, wherein one or more data requests 152 may be fed into information machine learning model 160 in order to receive outputs such as information output 156. In one or more embodiments, information training data 164 may include a plurality of data requests 152 correlated to a plurality of information outputs 156. In an embodiment, an input such as data request 152 may be correlated to an element of resource data 120 as indicated by information output 156. In one or more embodiments, processor 108 may classify data requests 152 to one or more information categorizations 144 wherein outputs of information machine learning model 160 may include outputs classified to the same information categorization 144. In one or more embodiments, resource data 120 may be used to generate information training data 164 and/or elements thereof. In one or more embodiments, information training data 164 may be retrieved from a database 116, generated by a third party, containing data from previous iterations and the like. In one or more embodiments, resource data 120 may be used to append resource data 120 to information training data 164 wherein processor 108 may be configured to iteratively append resource data 120 to information training data 164 as a function of received resource data 120. In one or more embodiments, resource data 120 may be appended to information training data wherein resource data 120 may be received as additional information outputs 156. In one or more embodiments, processor 108 may be configured to generate resource data 120 as a function of the classification of resource data 120 to one or more information categorization 144. In an embodiment, processor may select a grouping of resource data 120 to generate information training data 164. In one or more embodiments, differing categorizations of resource data 120 may require differing processes to generate inputs and correlated outputs for information training data. For example, and without limitations, resource data 120 containing user profile may require a differing process and/or differing hyperparameters to generate training data as opposed to resource data 120 containing educational information. This will be described in further detail below in reference to automated machine learning.

In one or more embodiments, processor may be configured to use automated machine learning to generate training data as a function of the resource data 120 wherein the training data includes data requests and correlated elements of resource data 120. "Automated machine learning" (AutoML) for the purposes of this disclosure is a process in which one or more processes of training a machine learning model may be automated. For example, and without limitation, Automated machine learning may include a process or preparing new data for use within a machine learning model, generating training data from newly received data, appending newly generated training data to existing training data and the like. In one or more embodiments, AutoML may be used to automate processes conventionally done by humans. For example, and without limitation, AutoML may be used for data preprocessing, wherein data preprocessing may include the removal of incorrect or inconsistent information, the removal of out-of-range values, the modification of data to a specific format and the like. In one or more embodiments, AutoML may be used to generate continuously retrain machine learning models based on newly acquired data such as resource data. in one or more embodiments, AutoML may be used to automate a process of generating training data with inputs and correlated outputs. In one or more embodiments, AutoML may automate the process of algorithm selection, hyperparameter optimization and the like the maximize the predictions made by the machine learning model. In one or more embodiments, AutoML may receive raw data, such as resource data and generate information training data. In one or more embodiments resource data 120 may be converted into information training data containing a plurality of data requests correlated to a plurality of informational outputs. In one or more embodiments, AutoML may be used to train and create a personalized machine learning model based on raw data. In one or more embodiments, AutoML may include systems and/or software such as but not limited to Google AutoML, Azure Machine learning, Amazon Sagemaker, Vertex AI, and the like. In one or more embodiments, processor may use one or more incremental learning systems in order to append resource data 120 to information training data 164 wherein outputs of information training data 164 may contain elements of resource data 120. In one or more embodiments, AutoML may be configured to select various models based on information within resource data 120 and select various hyperparameters that may be suited for generation of training data and/or training a machine learning model. In one or more embodiments, AutoML may be configured to structure resource data 120 to make it compatible with information training data 164 wherein the resource data 120 is structured into inputs with correlated outputs. In one or more embodiments, AutoML may receive groupings of resource data 120 that have been classified to information categorization 144 and generate training data for each grouping. In an embodiment, each information categorization may require differing optimization parameters, differing tested data sets, differing hyperparameters and the like. In one or more embodiments, information training data may be generated as a function of the classification of resource data 120 wherein portions of information training data 164 may be generated for each information categorization 144 and aggregated to create information training data 164. In one or more embodiments, information training data 164 may contain a plurality of subsets of training data wherein each subset contains training data generated for each information categorization 144. In one or more embodiments, elements of resource data 120 may differ and as a result require differing algorithms and/or parameters wherein generating information training data. In one or more embodiments, apparatus 100 may utilize one or more software integration processes to generate information training data 164 with resource data 120. In one or more embodiments, software integration processes may include the use of application program interfaces (API), plug-ins and the like.

With Continued reference to FIG. 1, processor 108 and/or information module 148 may use a template machine learning model to generate information training data 164 and/or portions thereof as a function of resource data 120. In one or more embodiments, the template machine learning model may be configured to receive an input such as resource data 120 and generate an output such as information training data 164 wherein the information training data 164 includes a plurality of data requests 152 correlated to a plurality of information outputs 156. In an embodiment, template machine learning model may be used to generate training data from raw data such as resource data 120. In one or more embodiments, template machine learning model may be used to generate training data with inputs correlated to personalized outputs wherein the personalized outputs contain portions of resource data 120. In one or more embodiments, template machine learning model may be trained with template training data containing a plurality of inputs correlated to a plurality of training data sets. In one or more embodiments, training machine learning model may be configured to generate information training data 164 containing data requests 152 correlated to information outputs 156. In one or more embodiments, template training data may be used to train template machine learning model. In one or more embodiments, template training data may include a plurality of resource data 120 correlated to a plurality of information training data 164. In one or more embodiments, categorizations of resource data 120 may affect the information training data 164 that is generated using template machine learning model. In an embodiment, data within resource data 120, such as but not limited to, user profile 136 may require a differing training data set than data within resource data 120 describing educational information for example. In one or more embodiments, template machine learning model may receive classified resource data 120 and generate portions of information training data as a function of each classification. For example, and without limitation, template machine learning model may receive data classified to a particular information categorization 144 wherein a particular set of information training data 164 is generated for the information categorization 144. Continuing, an input into template machine learning model such as user profile 136 may generate information training data 164 containing a plurality of data requests 152 correlated to a plurality of descriptive inputs 172 (as described in further detail below) whereas an input such as educational information may generate information training data 164 containing a plurality of data requests 152 correlated to a plurality of responsive outputs 168. In one or more embodiments, classification of resource data 120 may categorize resource data 120 wherein template machine learning model may generate a portion of information training data 164 for each information categorization 144 and aggregate the portions of information training data 164 to generate information training data. In one or more embodiments, outputs of template machine learning model may be used to append additional training data to information training data 164. In one or more embodiments, resource data 120 may be appended to information training data wherein template machine learning model generates training data as a function of the resource data and appends the training data to information training data 164. In one or more embodiments, template training data may be received from a user, 3$^{rd}$ party, previous iterations and the like as described in this disclosure.

With continued reference to FIG. 1, processor 108 and/or information module 148 may utilize a plurality of training data templates to generate information training data 164. "Training data template" for the purposes of this disclosure is training data that contains inputs with one or more empty slots configured to receive correlated outputs. In one or more embodiments, training data template may include a template that can be used to input personalized outputs in order to generate information training data 164 having inputs with correlated personalized outputs. In one or more embodiments, training data template may include a preset format of inputs and correlated outputs wherein the correlated outputs may be changed and/or added using resource data 120. In one or more embodiments, processor 108 may change the correlated outputs within training data template with personalized data from resource data 120. In one or more embodiments, training data template may include one or more blank fields that are configured to receive resource data 120 wherein preset inputs may be correlated to resource data 120. In one or more embodiments, the blank fields may be correlated to information categorizations 144 or subcategorizations of the information categorizations 144. In one or more embodiments, processor 108 and information module 148 may classify resource data 120 to subcategorizations wherein elements of resource data 148 are input into the training data template based on its classification. In one or more embodiments, processor 108 and/or information module 148 may receive a plurality of training data templates from database 116 wherein each training data template may be classified to an information categorization 144. In one or more embodiments, processor 108 may select a grouping of classified resource data 120 and modify each training data template to include elements of resource data 120. In one or more embodiments, processor 108 may aggregate multiple training data templates belonging to differing information categorizations 144 to generate information training data. In one or more embodiments, resource data 120 received for each iteration of apparatus 100 may be similar and as a result require a similar processing of generating information training data 164. In one or more embodiments, training data template may provide a template in which elements of resource data 120 may be input into the training data template in order to generate information training data 164. In one or more embodiments, training data template may include a template structure having placeholders and/or empty slots configured to receive portions of resource data 120. In one or more embodiments, processor may classify elements of resource data to the placeholders and/or empty slots using any classifier as described herein. In one or more embodiments, different iterations of apparatus 100 may have differing information training data 164 but still contains the same structure. In one or more embodiments, different iterations of apparatus may contain a similar training data structure but having personalized content. In one or more embodiments, generating the information training data as a function of the classification includes receiving the plurality of training data templates and generating information training data as function of the plurality of training data templates, wherein each training data template of the plurality of training data templates is associated with each information categorization 144 of the one or more information categorizations 144. In one or more embodiments database 116 may be populated with a plurality of training data templates, wherein each training data template may be classified to an information categorization. In one or more embodiments, a machine learning model such as any machine learning model as described herein may receive a plurality of training data templates and generate information in training data 164 using the plurality of training data templates and the resource data 120. In one or more embodiments, resource data 120 may be appended to information training data 164 wherein resource data may be appended to correlated outputs of information training data 164. In one or more embodiments, resource data 120 may be appended to information training data 164 wherein one or more training data templates are added to information training data 164.

With continued reference to FIG. 1, training data template may include a plurality of inputs correlated to a plurality of generalized outputs. In one or more embodiments, the generalized outputs may include outputs that are not specific to a person or entity. In one or more embodiments, information training data may include inputs that are correlated to generalized outputs. In one or more embodiments, processor may classify elements of resource data 120 to the generalized outputs wherein elements of resource data 120 are replaced with the generalized outputs to create personalized training data. In one or more embodiments, processor 108 may use a classifier such as any classifier as described herein to replace generalized outputs in training data template and/or any other training data with portions of resource data. In one or more embodiments, training data may contain labels indicating which outputs are general wherein processor may be configured to replace personalized outputs if an element of resource data 120 and the generalized output contain the same classification. In one or more embodiments, the generalized outputs may be classified to one or more categorizations wherein elements of resource data containing the same classification may replace the generalized outputs. In one or more embodiments, information training data 164 may include inputs with correlated generalized outputs wherein resource data 120 may be used to replace the generalized outputs with portions of resource data 120. In one or more embodiments, resource data 120 may be continuously appended to information training data 164 wherein resource data 120 may continuously replace existing generalized outputs with portions of resource data 120. In one or more embodiments, resource data 120 may be used to replace personalized outputs from previous iterations. For example, and without limitation, in a previous iteration a generalized output may be replaced with previous resource data 120 wherein in a current iteration the current resource data may replace the previous resource data 120. In one or more embodiments, resource data 120 may be appended to information training data 164 wherein resource data may replace generalized outputs of information training data with elements of resource data 120.

In one or more embodiments, resource data 120 may be continuously and/or systematically received wherein processor 108 may be configured to append resource data 120 to information training data 164 before and/or after each iteration of the processing. For example, processor 108 may be configured to retrieve resource data 120 before and/or after each iteration of the processing by apparatus 100 wherein processor 108 may be configured to iteratively update information training data 164. In one or more embodiments, processor 108 may receive resource data 120 and generate inputs and correlated outputs for information training data 164 to be used to train information machine learning model 160 using AutoML. In one or more embodiments, processor 108 may append resource data 120 to information training data 164 wherein information training data 164 is iteratively updated. In one or more embodiments processor 108 may classify resource data 120 to information categorizations 144 wherein the classified data may be used as outputs to similarly classified inputs. In one or more embodiments, information training data 164 may include a wide variety of generic information that is widely available to the public. For example, information training data 164 may include data associated with books, novels, magazine, articles research and/or any other information that may be retrieved from web crawler. In one or more embodiments, resource data 120 may be appended to information training data 164 wherein information training data 164 includes additional data that has been added by a user. In one or more embodiments, resource data 120 may be used to supplement an already existing information training data 164 to include additional data that is not commonly available to the public. In one or more embodiments, resource data 120 may be used to supplement information training data 164 with data that is not commonly used for machine learning models that are geared towards a large generic audience. In one or more embodiments, resource data 120 may be used to personalize information training data 164 wherein a portion of information training data 164 contains data that is specific to a user, data that is specific to an entity and/or data that is not commonly available to the public. In one or more embodiments, training data may be generated based on classified inputs and classified outputs, wherein inputs classified to the same information categorization 144 may be correlated to outputs classified to the same information categorization 144. In one or more embodiments, processor 108 and/or information module 148 may generate patterns within resource data 120 to be used as training data. In one or more embodiments, processor 108 and/or information module 148 may select a portion of resource data 120 to be used as a validation set wherein the validation set may be used to evaluate information machine learning model 160. In one or more embodiments the validation set may be used to determine how accurately information machine learning model 160 may generate outputs. In one or more embodiments, processor 108 and/or information module 148 may use a test set to evaluate information machine learning models 160 accuracy after training. In one or more embodiments, a test set may include inputs and outputs wherein inputs may be input into machine learning model such that outputs of machine learning model and test set may be compared. In an embodiment test set may include a plurality of inputs and accurate outputs wherein the accurate outputs may be compared to the outputs of information machine learning model 160 to determine if output of information machine learning model 160 are accurate. In one or more embodiments, processor 108 may generate a degree of match between an output of information machine learning model 160 and the output in test set to determine the accuracy of information machine learning model. In one or more embodiments, test set may include data that has not been introduced to information machine learning model during training. In one or more embodiments, outputs of information machine learning model 160 may be compared to outputs within test set to determine if outputs of information machine learning model 160 are accurate. In one or more embodiments, processor may be configured to determine a level of accuracy, precision and/or any other comparison techniques to determine the accuracy of information machine learning model. In one or more embodiments, information training data 164 may be used to train information machine learning model 160. In one or more embodiments, information output 156 may be generated as a function of information machine learning model 160. In one or more embodiments, information machine learning model 160 may be trained as a function of the classification of resource data 120 to one or more information categorizations 144. In one or more embodiments, information training data 164 may include a plurality of data requests 152 correlated to plurality of elements of resource data 120 wherein each element of resource data 120 has been classified to an information categorization 144. In one or more embodiments, data requests 152 and resource data 120 may be classified to the same categorization wherein inputs of information machine learning model 160 are associated with outputs within the same categorization.

With continued reference to FIG. 1, resource data 120 may be specific and/or unique to each individual user and/or entity such that outputs of information module 148 and/or information machine learning model 160 may differ. For example, and without limitation, a first entity using apparatus 100 may receive an information output 156 associated with a data request 152 wherein a second entity may receive a differing information output 156 associated with the same data request 152. Continuing, the data request 152 may contain information to receive financial information wherein the first entity may receive differing financial information as the second entity due to the differing resource data 120 used to generated information training data 164. In another non limiting example, a first user may request educational information as part of a data request 152 and receive a first information output 156 whereas a second user requesting the same educational information may receive a second information output 156 which differs from first education output. In one or more embodiments, outputs of information module 148 may be unique wherein each user and/or entity may receive differing outputs based on the resource data 120 received.

With continued reference to FIG. 1, information output 156 may include an output of information module 148 and/or information machine learning model 160. In one or more embodiments, information output 156 may include a responsive output 168. "Responsive output" for the purposes of this disclosure is an output of a machine learning model that contains information suitable to satisfy a request within data request 152. For example, responsive output 168 may include information responding to a data request 152 about biology. In one or more embodiments, responsive output 168 may include answers as information outputs 156 to questions within data request 152. In one or more embodiments, responsive output 168 may include educational and/or informative information that has been retrieved by resource data 120. In one or more embodiments, responsive output 168 may include elements of resource data 120 that can be used to supplement generic outputs. "Generic output" for the purposes of this disclosure is an output of a machine learning model that is not specific to a user. For example, two users may input a particular request into a machine learning model wherein the outputs may be similar. In contrast, information output 156 may be different for each user of apparatus 100 wherein resource data 120 may be used to generate specific outputs. In one or more embodiments, resource data 120 may be used to supplement generic outputs made by machine learning models. For example, a request input into a machine learning model such as "how can my company improve" may include a generic output such as improvements that historically or generally have been used to improve companies. In contrast and continuing the non-limiting example, information output 156 may include improvements that are specific to the entity in which the user is referring to. For example, resource data 120 may include a company's financials and/or any other information wherein information module 148 and/or information machine learning model 160 may determine what specific aspects of the company can be improved. As a result, information output 156 may contain an output that is specific to the user and the resource data 120 received. Similarly, and in another non limiting example, a user may input "how can I improve" into a machine learning model machine learning model wherein a generic output may include information on how an ordinary individual can improve based on historical data and/or trends. However, information module 148 and/or information machine learning model 160 may generate information output 156 and/or responsive output 168 that contains information on how the user can improve based on their user profile 136. In one or more embodiments, information output 156 may further include a descriptive input 172. "Descriptive input" for the purposes of this disclosure is a personalized data request 152 wherein the data request 152 is modified to be specific to a user or entity. For example, and without limitation, a data request 152 may include a request such as "teach me something" wherein descriptive input 172 may include a personalized data request 152 based on resource data 120 such as "generate information associated with biology, particularly, the liver. In addition, make the information in a bullet point format." In one or more embodiments, descriptive input 172 may be used as an input into large language models 180 wherein the inputs are personalized and geared towards the user's or entity's needs as indicated by resource data 120 and/or user profile 136. In one or more embodiments, descriptive input 172 may be used to add additional information into data request 152 in order to avoid generic responses from the large language models 180. In one or more embodiments, descriptive input 172 may be used to generate outputs using large language models 180 that are specific to a user or entity. In one or more embodiments, descriptive inputs 172 may be used to supplement data request 152 to ensure that outputs of the large language models 180 are specific to the user. For example, and without limitation, a data request 152 such as "how to improve the growth of my company" may create a descriptive input 172 that contains various details of the entity as retrieved by resource data 120. This may include but is not limited to, the industry the entity is in, various issues the entity is currently facing and the like. As a result, the large language model 180 may provide information that is specific to the user or entity based on the inputs received.

Still referring to FIG. 1, information output 156 and/or descriptive input 172 may be used to generate user specific outputs 176 using a large language model 180. "User specific outputs" for the purposes of this disclosure are outputs that have been generated using descriptive inputs 172 as an input into a large language model 180. For example, a descriptive input 172 may include a request to receive a particular set of information wherein user specific output 176 may include an output by the large language model 180. In one or more embodiments, information machine learning model 160 may receive user profile 136 and generate a descriptive input 172 as a function of user profile 136. In one or more embodiments, information machine learning model 160 may receive data request 152 and generate descriptive inputs 172 as a function of user profile 136. In one or more embodiments, information machine learning model 160 may generate descriptive output using virtual activity data, actual activity data, educational obstacle datum and the like. In one or more embodiments, user profile 136 may be used to narrow results generated by the large language model 180. In one or more embodiments, user profile 136 may be used to generate descriptive outputs associated with a user's educational difficulties. In one or more embodiments, user profile 136 may be used to generate user specific outputs 176 that are associated with the user's mental capacity, learning capacity, capable to understand various words and the like. In one or more embodiments, information module 148 may utilize large language model 180 to generate user specific outputs 176. In one or more embodiments, information module 148 may modify data request 152 in order to generate outputs of the large language model 180 that are specific to a user or entity based on resource data 120. A "large language model," as used herein, is a deep learning algorithm that can recognize, summarize, translate, predict, and/or generate text and other content based on knowledge gained from massive datasets. LLMs 180 may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs 180, in some embodiments, may include GPT, GPT-2, GPT-3, and other language processing models. LLM 180 may be used to generate outputs based on an input such as, for example, descriptive input 172. Training data may correlate descriptive outputs to a plurality of user specific outputs 176 or prompts, wherein a prompt includes an output of the LLM 180. Training data may correlate elements of a dictionary related to linguistics, as described above, to a prompt. LLM 180 may include a text prediction-based algorithm configured to receive an article and apply a probability distribution to the words already typed in a sentence to work out the most likely word to come next in augmented articles. For example, if the words already typed are "Nice to meet", then it is highly likely that the word "you" will come next. LLM 180 may output such predictions by ranking words by likelihood or a prompt parameter. For the example given above, the LLM 180 may score "you" as the most likely, "your" as the next most likely, "his" or "her" next, and the like.

Still referring to FIG. 1, LLM 180 may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM 180 may predict the next word by searching for a set of position in a source sentence where the most relevant information is concentrated. LLM 180 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation. In some embodiments, LLM 180 may include encoder-decoder model incorporating an attention mechanism.

Still referring to FIG. 1, LLM 180 may include a transformer architecture. In some embodiments, encoder component of LLM 180 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM 180 and/or transformer architecture may include an attention mechanism. An "attention mechanism," as used herein, is a part of a neural architecture that enables a system to dynamically quantify the relevant features of the input data such as for example, descriptive input 172. In the case of natural language processing, input data may be a sequence of textual elements. It may be applied directly to the raw input or to its higher-level representation.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 180 may predict the next word by searching for a set of position in a source sentence where the most relevant information is concentrated. LLM 180 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM 180, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 180 may pick up particular parts at different positions in the input sequence and over time compute an initial composition of the output sequence. In multi-head attention, LLM 180 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 180 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM 180 may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 180 may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM 180 may learn to associate the word "you", with "how" and "are". It's also possible that LLM 180 learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow LLM 180 to learn to extract and focus on different combinations of attention from its attention heads.

Still referring to FIG. 1, in some embodiments, generating user specific outputs 176 may further include generating an aggregate output. An "aggregate output," for the purposes of this disclosure is a user specific output 176 that is produced by an aggregation of a plurality of data that the LLM 180 has access to. For example, and without limitations, aggregate output may include an aggregation of articles, research, books and the like. Computing device 104 may be configured to generate an aggregate output from a plurality of related data generated or received by computing device 104. In some embodiments, this may be done periodically—i.e. monthly, weekly, yearly, and the like.

With continued reference to FIG. 1, information module 148, processor 108 and/or LLM 180 may utilize an inference engine to determine what information is being requested within data request 152. Additionally, or alternatively, information module 148, processor 108 and/or LLM 180 may utilize inference engine to transform generated data into coherent outputs. "Inference engine" for the purposes of this disclosure is system which applies a set of logical rules to in order to deduce new knowledge. In one or more embodiments, inference engine may be used to draw logical conclusions of a piece of literary work, from an input and the like. In one or more embodiments, inference engine may be used to generate logical relationships between two data. For example, and without limitation, inference engine may be used to generate logical relationships between elements within an input such as data request 152. In one or more embodiments, inference engine may identify patterns within inputs in order to determine the information that is being requested, the context of the information and the like. For example, an inference engine may determine that the words "where is" may indicate a request to locate something. In one or more embodiments, inference engine may be trained within a plurality of training data correlating words, phrase and the like to a plurality of patterns wherein each pattern may be indicative of a particular request. For example, a phrase beginning with "Tell me something about" may indicate that the input is requesting information about a particular topic, whereas a phrase beginning with "how do I" may indicate the user is requesting instructions regarding a topic. In one or more embodiments, inference engine may be used to determine a request for the machine learning model. In one or more embodiments, inference engine may be used to generate coherent sentences and phrases based on data generated wherein the inference engine may use patterns to generate words or sentences. For example information module 148 may receive a request within data request 152 to discuss biology wherein information module 148 may retrieve pieces of data associated with biology, such as from resource data 120, and aggregate the data together to generate coherent sentences.

With continued reference to FIG. 1 inference engine may include and/or be communicatively connected to a knowledge base. "Knowledge base" for the purposes of this disclosure is a collection of information that is used by inference engine to generate logical inferences and conclusions. In one or more embodiments, knowledge base may include facts about a real or fictious world. In one or more embodiments, the inference engine may apply logical rules to the knowledge base in order to generate new knowledge. In one or more embodiments, knowledge base may be populated information outputs 156. In one or more embodiments, a machine learning model may be configured to generate information or sets of information for information output 156. In one or more embodiments, the machine learning model may be configured to summarize or shorten generated data wherein the summarized and/or shortened generated data is included within information output 156. In one or more embodiments, inference engine may include a set of rules that may be used to generate logical relationships between one or more elements of resource data 120 and/or information output 156. In one or more embodiments, logical relationships may be used to generate coherent sentences within information output 156. In one or more embodiments, inference engine may contain a plurality of logical rules that have been retrieved by database 116. In one or more embodiments, a machine learning model containing logical training data may be used to generating logical rules for the inference engine. In one or more embodiments, logical training data may include a plurality of literary works, research documents, educational materials and the like correlated to a plurality of logical rules.

With continued reference to FIG. 1, Information module 148 may receive data request 152 and outputs user specific outputs 176 and/or information outputs 156. In one or more embodiments, outputs of information module 148, such as information outputs 156 may include associated metadata 128. In one or more embodiments, information module 148 may utilize resource data 120 wherein elements of resource data 120 are present within information outputs 156 and/or user specific outputs 176. For example, and without limitation, information output 156 may include financial documents or information retrieved from financial documents within resource data 120. In one or more embodiments, metadata 128 may be used to identify the source of the information that has been generated by information module 148. In one or more embodiments, metadata 128 may be sued to determine the accuracy of resource data 120. In one or more embodiments, a user may determine whether information output 156 is accurate based on the metadata 128 provided. For example, and without limitation, an information output 156 may include financial information about an entity wherein the financial information may have been retrieved from a meeting. In one or more embodiments, a user may determine the accuracy of what was spoken in the meeting to determine if information output 156 was accurate. In one or more embodiments, resource data 120 may be secured on immutable sequential listing wherein a user may access an untampered or persevered version of resource data 120. In one or me embodiments, modification of resource data 120 may further be stored on immutable sequential listing wherein individuals may view modifications that have been made to resource data 120. In one or more embodiments, information output 156 may include a plurality of metadata 128 such as but not limited to, a plurality of metadata 128 associated with one or more elements of resource data 120.

In one or more embodiments, processor 108 may receive resource data 120 and generate information training data 164 and/or append resource data 120 to information training data 164. In one or more embodiments, information module 148 may receive data request 152 from a user wherein information module 148 may generate information outputs 156 and/or user specific outputs 176. In one or more embodiments, information module 148 may generate descriptive inputs 172 wherein descriptive inputs 172 may be fed into large language model 180. Additionally or alternatively, large language model 180 may receive data request 152 and output user specific outputs 176. In one or more embodiments, user specific outputs 176 may then be received by information machine learning model 160 wherein information machine learning model 160 may generate information outputs 156. In one or more embodiments, information machine learning model 160 may modify user specific outputs 176 based on resource data 120. For example, information machine learning model 160 may simplify information within user specific outputs 176 based on user profile 136. Additionally or alternatively, information machine learning model 160 may receive user specific outputs 176 and append the user specific outputs 176 to contain elements of resource data 120. for example, and without limitation, information machine learning model 160 may append information that is specific to an entity to user specific outputs 176 in order to generate information outputs 156. In one or more embodiments, information module 148 may be used to generate outputs that are specific to an entity. In one or more embodiments, information module 148 may be used to modify outputs of a large language model 180 such that they are specific to an entity. In one or more embodiments, information module 148 may receive data requests 152 in order to generate inputs that can be used to generate user specific outputs 176 of a large language model 180. In one or more embodiments, resource data 120 may be used to iteratively train information machine learning model 160 wherein resource data 120 is received periodically (e.g. daily, monthly, etc.) and appended to information machine learning model 160. In one or more embodiments, resource data 120 may further include a user's interactions with apparatus 100 wherein information machine learning model 160 may be trained to understand specific requests made by a user. In one or more embodiments, information module 148 and/or information machine learning model 160 may be iteratively trained through user input 140. For example, and without limitation use input may indicate that an element of information output 156 is inaccurate wherein processor 108 and/or information module 148 may be configured to remove portions or resource data 120 associated with the inaccurate element. In one or more embodiments, information module 148 may be iteratively trained wherein a user may indicate that one or more outputs are incorrect. In one or more embodiments, information module 148 may be iteratively trained wherein user input 140 may indicate that two elements of information output 156 have no correlation. For example, information output 156 may include two elements of resource data 120 wherein user input 140 may indicate that the elements are not correlated.

With continued reference to FIG. 1, in one or more embodiments, processor 108 may be configured to generate a virtual avatar model 184. In one or more embodiments, virtual avatar model 184 may include chatbot system as described above and in further detail in reference to FIG. 3. In one or more embodiments, virtual avatar model 184 may be used to communicate outputs of information module 148 such as but not limited to, information outputs 156 and user specific outputs 176. In one or more embodiments, communication between information module 148 and at least one virtual avatar and/or virtual avatar model 184 may be in real time. For example, the communications above may be in high time resolution (i.e., low latency). "High time resolution" as used in this disclosure is defined as a computer network that is optimized to process a very high volume of data messages with minimal delay (latency).

Still referring to FIG. 1, apparatus 100 may be configured to instantiate, in a user interface, virtual avatar model 184. In an embodiment, the virtual avatar model 184 may include a base image and a plurality of animations of the base image, wherein the virtual avatar may be configured to receive an educational response and display an animation of the plurality of animations as a function of the educational response. "Virtual avatar" as used in this disclosure is defined as an interactive character/entity in a virtual world. For example, a virtual avatar may include a base image consisting of a computer-generated image associated with the user/entity. "Animation" as used in this disclosure is defined as a form of digital medeca production that includes using computer software to create moving images. For example, an avatar may be a 3-dimensional model that is capable of changing its shape with animations, such as human simulation animations like walking or falling down. The animation may also include video clips and animated clips, such as short videos used on a website, which may be a part of a longer recording. For example, the animation may be stitched together into sequences by splicing together multiple animations (e.g., short videos) to create a new, original video/animation. In an embodiment, there may be one or more post-sequence static set ups for the virtual avatar which may be still or in video format. For example, a virtual avatar may have a resting, default face (e.g., not showing any sign of emotion) and an expression corresponding to a previous sequence may be added. For example, a virtual avatar may initially be present with a resting, default face devoid of emotion and a smiling, happy expression corresponding to a previous sequence may be added. In yet another embodiment, each sequence may include a label representing each sequence to which responses and/or contexts could be matched. In an embodiment, instantiating the virtual avatar model 184 may further include generating a plurality of rules linking user input 140 to animations. This may be accomplished by generating a response model, which includes generating a plurality of responses and a plurality of rules matching inputs to responses (i.e. the response generated based on the input) and then generating pairs of all potential responses to animations or rules associating groups of responses to animations. For example, a response may be positive which may be linked to an animation of hands clapping. In another embodiment, generating a plurality of rules may also include receiving a plurality of training examples correlating response data to animations and training a classifier using the plurality of training examples, wherein the response classifier is configured to input a response and output a rule linking the educational response to an animation. The response classifier machine learning model may be supervised and trained with training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database 116 such as any database 116 described in this disclosure or be provided by a user. In other embodiments, a machine-learning module may obtain a training set by querying a communicatively connected database 116 that includes past inputs and outputs. Training data may include inputs from various types of databases 116, resources, and/or user inputs 140 and outputs correlated to each of those inputs so that a machine-learning module may determine an output, such as labels of animations or sequences of labels, for an input, such as response from a chatbot, user inputs 140 and/or a combination of one or more inputs with one or more inputs from previous iterations. For example, labels of animations or sequences of labels may be utilized to retrieve and display animations or sequences of animations. By way of a further example, the way in which the virtual avatar responds may be based on the context of an earlier conversation and/or an earlier exchange in a conversation. Correlations may indicate causative and/or predictive links between data, which may be modeled as relationships, such as mathematical relationships, by machine-learning processes, as described in further detail below. In an embodiment, various classifiers may be utilized depending on where a geographic location of a user is, the time of day and/or other circumstances. Alternatively or additionally the geographic location of a user, the time of day and/or other circumstances may be utilized as training data for the classifier. In an embodiment, the geographic location of a user, the time of day and/or other circumstances may be utilized as inputs for the classifier. Each of the above steps may be performed by classifier or other machine learning model which are described in further detail below.

In an embodiment, virtual avatar model 184 may be customizable. For example, the user may be able to cosmetically design an avatar and choose personalized characteristics. Virtual avatar model 184 may include, without limitation, an animal, human, robot, inanimate object, and the like. In an embodiment, personalized characteristics may be also derived from user's behavior. For example, user may have a unique gait which may be incorporated by the virtual avatar. Virtual avatar model 184 may include one or more animation files and/or video clips and may include one or more files and/or video clips of the user. In an embodiment, generating the virtual avatar model 184 may include creating a digital representative for simulating one or more interactions in the extended reality space. Extended reality is discussed in more detail below. In one or more embodiments, virtual avatar model 184 may be customizable based on elements within user profile 136. In one or more embodiments, virtual avatar model 184 may be generated as a function of user profile 136. In one or more embodiments, outputs of processor 108 may be presented to a user through interaction with virtual avatar model 184. In one or more embodiments, virtual avatar model 184 may be configured to generate speech though one or more text-to-speech software. In one or more embodiments, the text to speech software may contain various configurations wherein audio generated by the text to speech software may contain differing voices, differing dialects and the like. In one or more embodiments, virtual avatar model 184 may present any outputs generated by apparatus 100 such as, but not limited to, user specific outputs 176, information outputs 156, and the like.

With continued reference to FIG. 1, in one or more embodiments, virtual avatar model 184 may be used to simulate human interaction between a user and a computing device 104. In one or more embodiments, virtual avatar model 184 may be used to simulate a teacher-classroom setting wherein virtual avatar model 184 may present information or request inputs from the user. In one or more embodiments, virtual avatar model 184 may be used to simulate human interaction between a user and apparatus 100 in order to receive information.

With continued reference to FIG. 1, processor 108 may be configured to modify a graphical user interface as a function of data generated by information module 148, such as but not limited to user specific outputs 176 and information outputs 156. In some cases, processor 108 may be configured to create a user interface data structure. As used in this disclosure, "user interface data structure" is a data structure representing a specialized formatting of data on a computer configured such that the information can be effectively presented for a user interface. User interface data structure may include any data as described in this disclosure. In one or more embodiments, user interface data structure may include information associated virtual avatar model 184. In one or more embodiments, processor 108 may be configured to retrieve data associated with virtual avatar model 184.

With continued reference to FIG. 1, processor 108 may be configured to transmit the user interface data structure to the graphical user interface. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others.

Processor 108 may transmit the data described above to database 116 wherein the data may be accessed from database 116. Processor 108 may further transmit the data above to a device display or another computing device 104.

With continued reference to FIG. 1, apparatus 100 may include a graphical user interface (GUI). For the purposes of this disclosure, a "user interface" is a means by which a user and a computer system interact. For example, through the use of input devices and software. In some cases, processor 108 1 may be configured to modify graphical user interface as a function of the data described above by populating user interface data structure with any data as described herein, such as but not limited to, user specific outputs 176 and/or information outputs 156, and visually presenting the data modification of the graphical user interface. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, apparatus 100 may further include a display device communicatively connected to at least a processor 108. "Display device" for the purposes of this disclosure, is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through the GUI to a user, wherein a user may interact with the data through GUI. In some cases, a user may view GUI through display.

Figure 2:
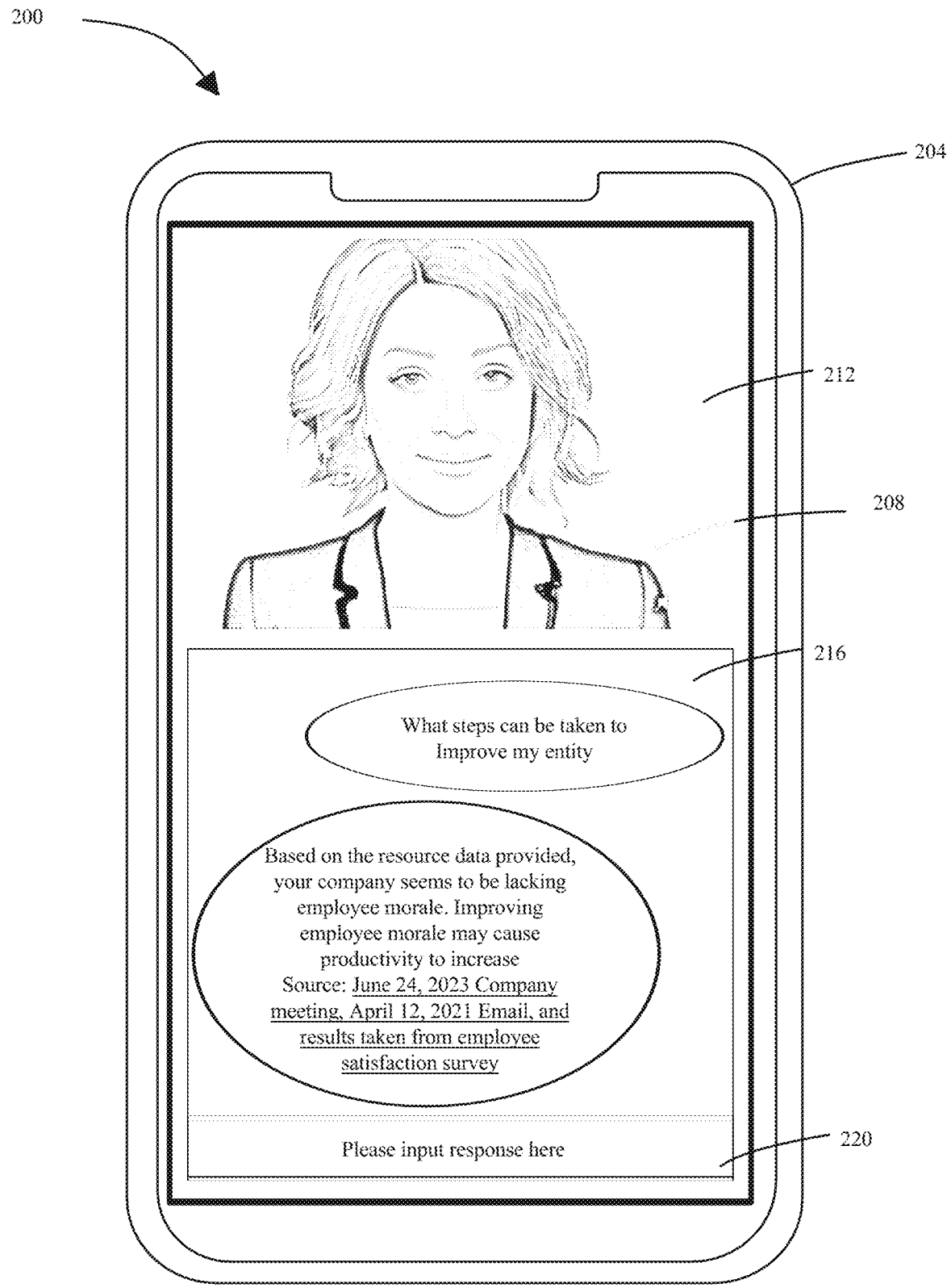
FIG. 2 is an exemplary embodiment of a graphical user interface in accordance with this disclosure.

Referring now to FIG. 2, an exemplary embodiment of a GUI 200 on a display device 204 is illustrated. GUI 200 is configured to receive the user interface structure as discussed above and visually present any data described in this disclosure. Display device 204 may include, but is not limited to, a smartphone, tablet, laptop, monitor, tablet, and the like. Display device 204 may further include a separate device that includes a transparent screen configured to display computer generated images and/or information. In some cases, GUI 200 may be displayed on a plurality of display devices. In some cases, GUI 200 may display data on separate windows 208. A "window" for the purposes of this disclosure is the information that is capable of being displayed within a border of device display. A user may navigate through different windows 208 wherein each window 208 may contain new or differing information or data. For example, a first window 208 may display information relating to receiving user inputs, whereas a second window may present information output and/or user specific outputs as described in this disclosure. A user may navigate through a first second, third and fourth window (and so on) by interacting with GUI 200. For example, a user may select a button or a box signifying a next window on GUI 200, wherein the pressing of the button may navigate a user to another window. In some cases, GUI may further contain event handlers, wherein the placement of text within a textbox may signify to computing device 104 to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various windows 208 wherein each window 208 may request or display information to or from a user. In this instance, window 208 may display a virtual avatar model 212, such as the virtual avatar model as described in reference to FIG. 1 In one or more embodiments, virtual avatar model 212 may display visual animations to a user, such as simulations replicating human interaction. In one or more embodiments, virtual avatar model 212 may simulate speech and/or human emotion through manipulation of virtual facial features of virtual avatar model 212. In one or more embodiments, virtual avatar model 212 may simulate speech through one or more text-to-speech software as described in this disclosure. In one or more embodiments, virtual avatar model 212 may interact with a user through one or more dialogue boxes 216 wherein the dialogue boxes may include speech generated by virtual avatar model 212 and corresponding responses by the user. In one or more embodiments, GUI 200 may include a textbox 220 wherein the textbox 220 may be configured to receive user input. In one or more embodiments, textbox 200 may receive user input 132 such as any input as described above, such as but not limited to, data request, user input and the like.

With continued reference to FIG. 2, in this instance dialogue box 216 includes information associated with a user requesting information about their entity. In one or more embodiments outputs of virtual avatar model 212 may be received from information module as described above. In one or more embodiments, outputs of virtual avatar model 2123 may include elements of resource data as described above. In one or more embodiments, outputs of virtual avatar model may be generated as function of resource data as described above. In one or more embodiments, outputs of virtual avatar model 212 may contain associated metadata wherein the associated metadata may indicate the data that was used to generate an output.

Figure 3:
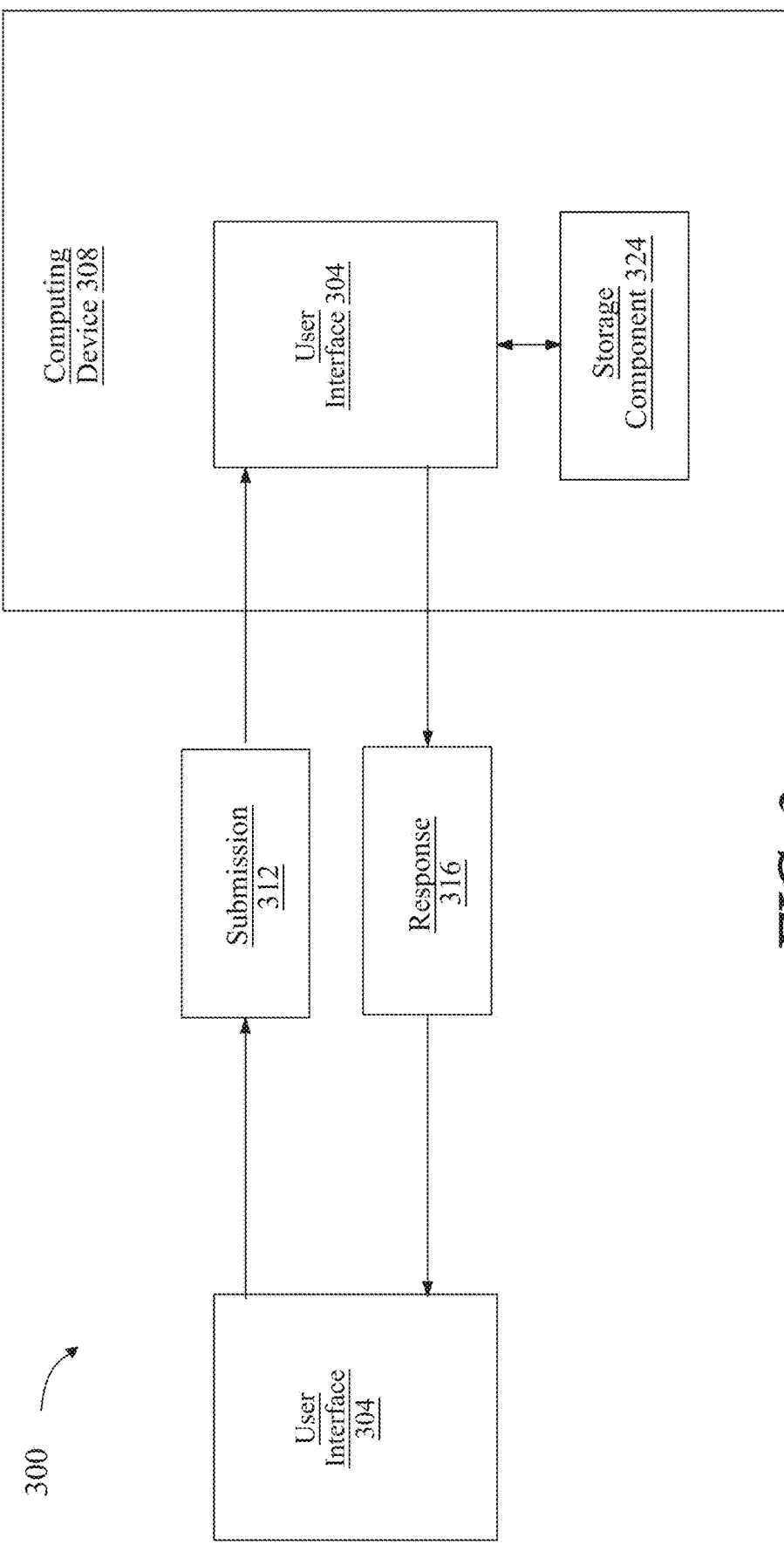
FIG. 3 is a block diagram of exemplary embodiment of a chatbot.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 312 using one or more of keyword recognition, pattern matching, and natural language processing. In some embodiments, processor employs real-time learning with evolutionary algorithms. In some cases, processor 320 may retrieve a pre-prepared response from at least a storage component 324, based upon submission 312. Alternatively or additionally, in some embodiments, processor 320 communicates a response 316 without first receiving a submission 312, thereby initiating conversation. In some cases, processor 320 communicates an inquiry to user interface 304; and the processor is configured to process an answer to the inquiry in a following submission 312 from the user interface 304. In some cases, an answer to an inquiry present within a submission 312 from a user device 304 may be used by computing device 104 as an input to another function, for example without limitation at least a feature or at least a preference input.

Figure 4:
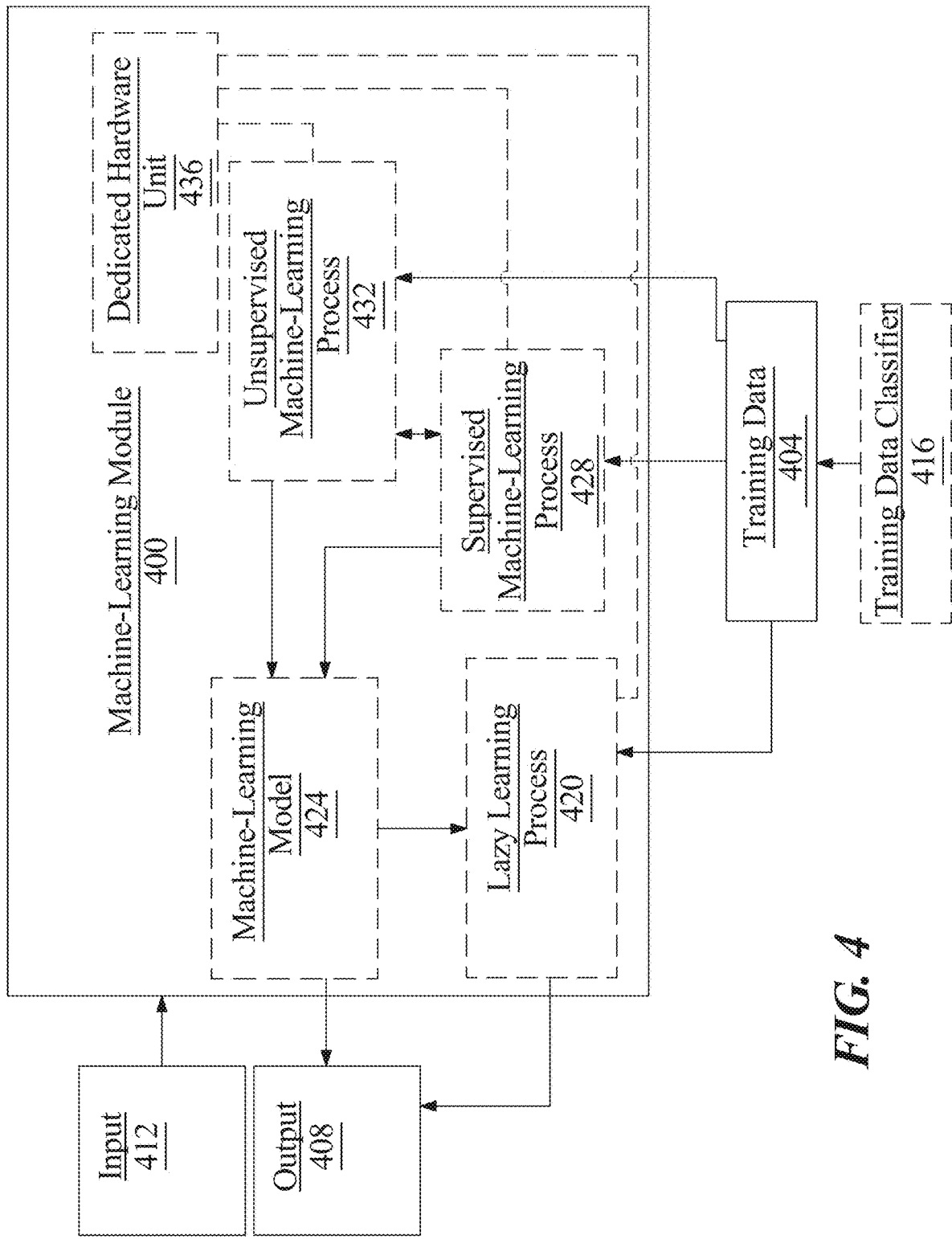
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process,"

as used in this disclosure, is a process that automatically uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include resource data, data requests and the like whereas outputs may include user specific outputs, information outputs and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to information categorization, wherein training data may be classified to each information category. For example and without limitation, an input and output of training data may be classified to a financial categorization, an educational categorization, a biology categorization and the like. In one or more embodiments, classification may allow for optimization of one or more machine learning models wherein resource data may be appended to training data. In one or more embodiments, classification may allow for increased accuracy in instances where training data is constantly updated. In one or more embodiments, classification may ensure that correlated outputs are within the same categorization as inputs. In one or more embodiments, classification may decrease error rates in outputs.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as data request, resource data, user input and the like as described above as inputs, information outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
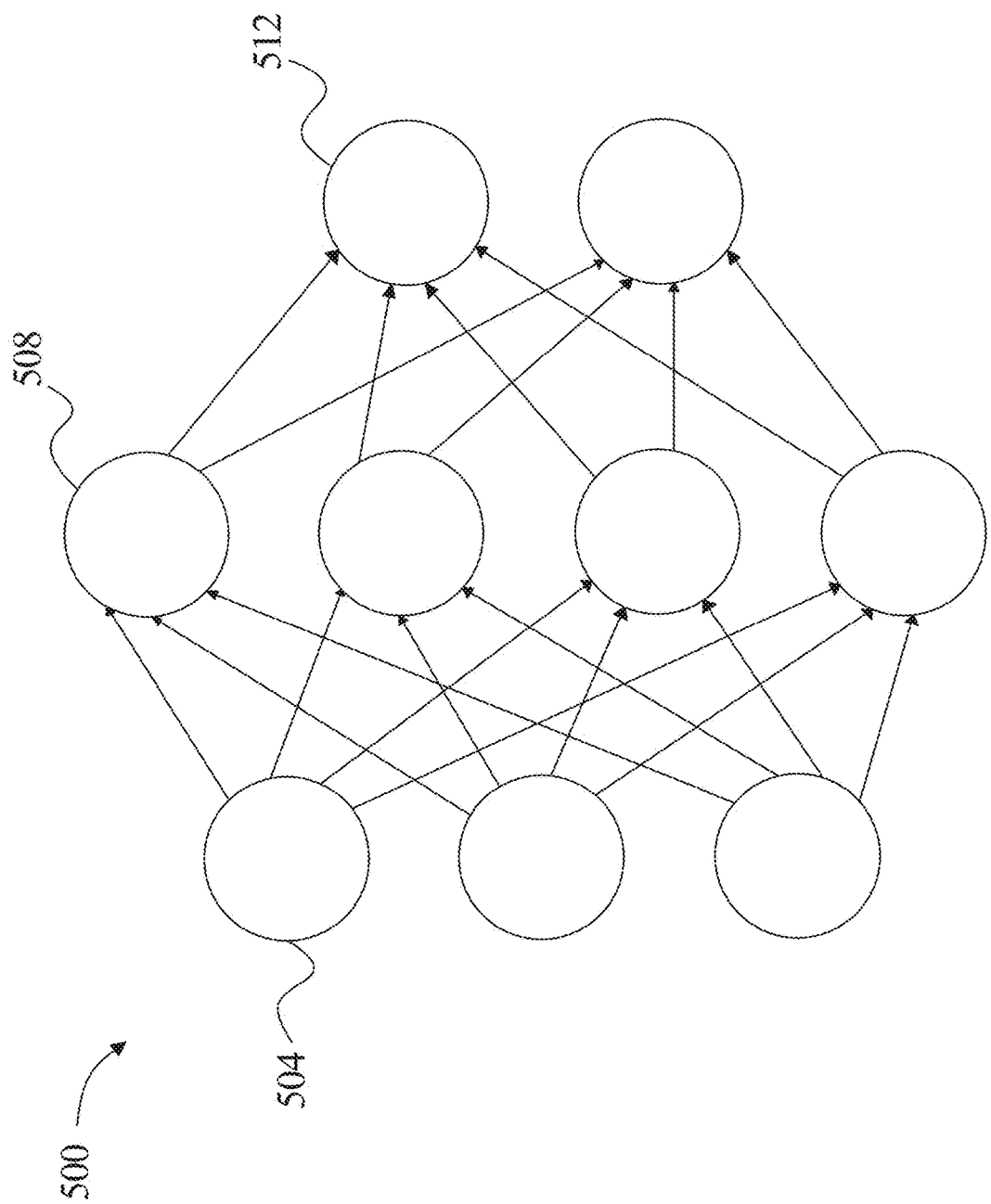
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
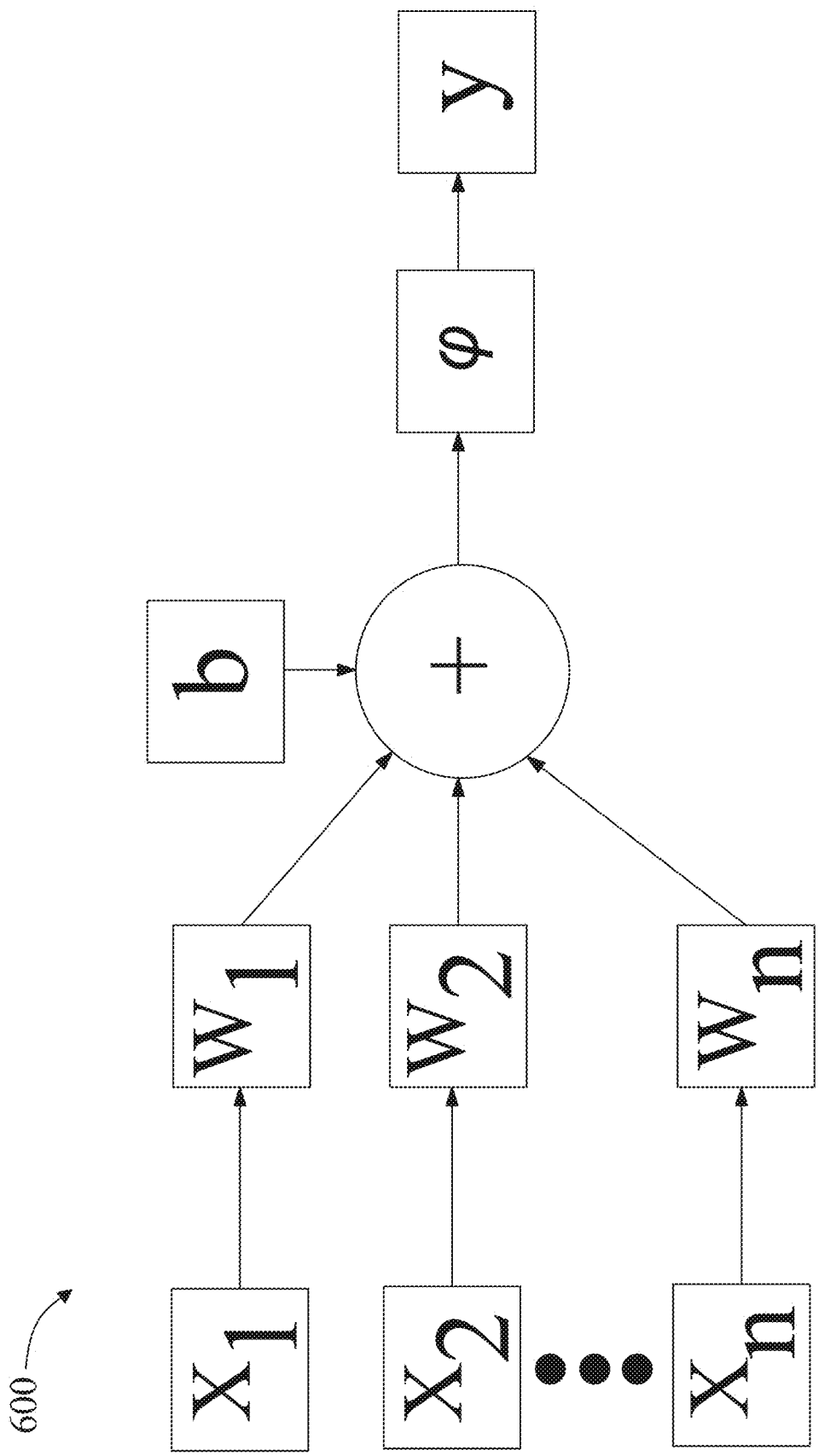
FIG. 6 is a block diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
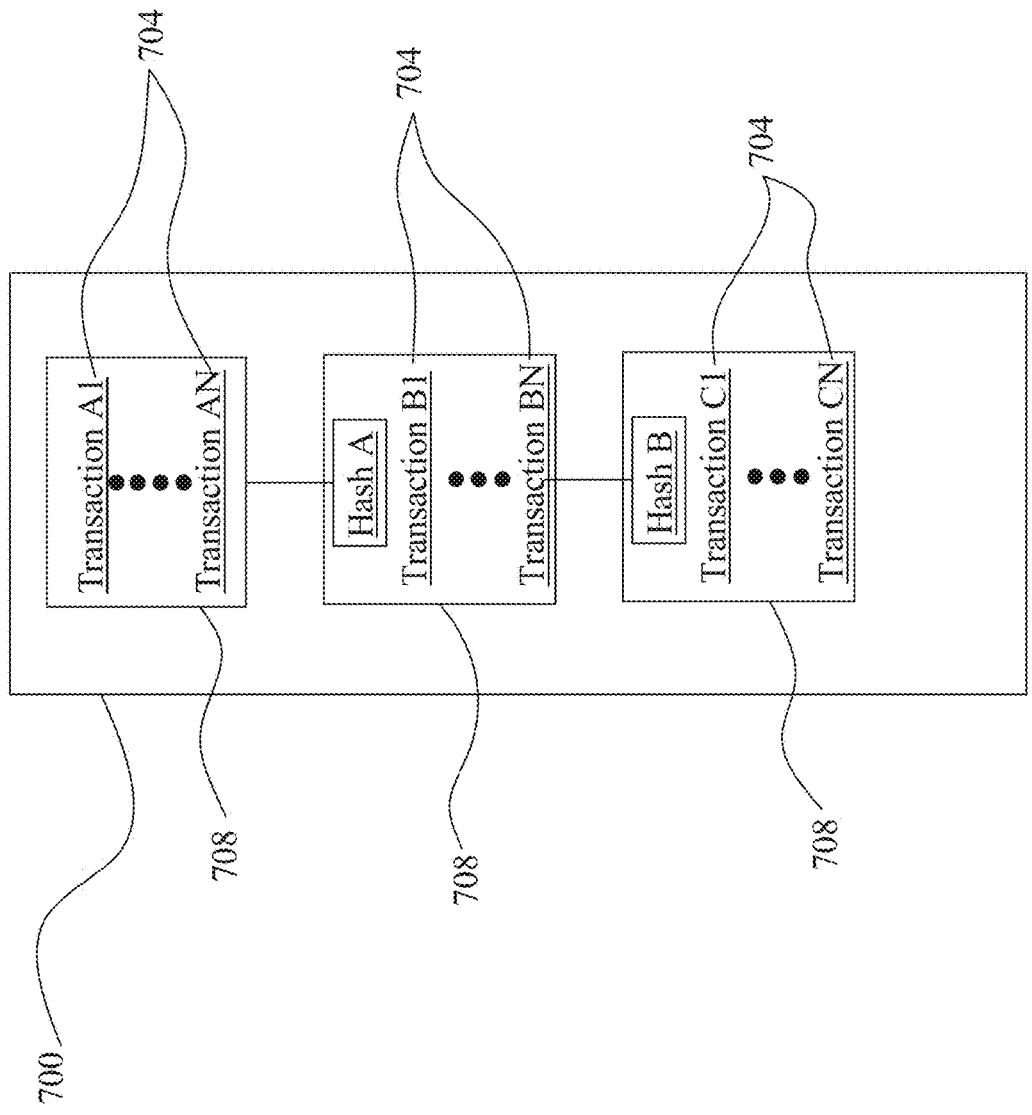
FIG. 7 is an exemplary embodiment of an immutable sequential listing.

Referring now to FIG. 7, an exemplary embodiment of an immutable sequential listing 700 is illustrated. Data elements are listing in immutable sequential listing 700; data elements may include any form of data, including textual data, image data, encrypted data, cryptographically hashed data, and the like. Data elements may include, without limitation, one or more at least a digitally signed assertion. In one embodiment, a digitally signed assertion 704 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 704 register is transferring that item to the owner of an address. A digitally signed assertion 704 may be signed by a digital signature created using the private key associated with the owner's public key, as described above.

Still referring to FIG. 7, a digitally signed assertion 704 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 704 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 7, in one embodiment, an address is a textual datum identifying the recipient of virtual currency or another item of value in a digitally signed assertion 704. In some embodiments, address is linked to a public key, the corresponding private key of which is owned by the recipient of a digitally signed assertion 704. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 704 may record a subsequent a digitally signed assertion 704 transferring some or all of the value transferred in the first a digitally signed assertion 704 to a new address in the same manner. A digitally signed assertion 704 may contain textual information that is not a transfer of some item of value in addition to, or as an alternative to, such a transfer. For instance, as described in further detail below, a digitally signed assertion 704 may indicate a confidence level associated with a distributed storage node as described in further detail below.

In an embodiment, and still referring to FIG. 7 immutable sequential listing 700 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 700 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 7, immutable sequential listing 700 may preserve the order in which the at least a posted content took place by listing them in chronological order; alternatively or additionally, immutable sequential listing 700 may organize digitally signed assertions 704 into sub-listings 708 such as "blocks" in a blockchain, which may be themselves collected in a temporally sequential order; digitally signed assertions 704 within a sub-listing 708 may or may not be temporally sequential. The ledger may preserve the order in which at least a posted content took place by listing them in sub-listings 708 and placing the sub-listings 708 in chronological order. The immutable sequential listing 700 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 700 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 7, immutable sequential listing 700, once formed, may be inalterable by any party, no matter what access rights that party possesses. For instance, immutable sequential listing 700 may include a hash chain, in which data is added during a successive hashing process to ensure non-repudiation. Immutable sequential listing 700 may include a block chain. In one embodiment, a block chain is immutable sequential listing 700 that records one or more new at least a posted content in a data item known as a sub-listing 708 or "block." An example of a block chain is the BITCOIN block chain used to record BITCOIN transactions and values. Sub-listings 708 may be created in a way that places the sub-listings 708 in chronological order and link each sub-listing 708 to a previous sub-listing 708 in the chronological order so that any computing device may traverse the sub-listings 708 in reverse chronological order to verify any at least a posted content listed in the block chain. Each new sub-listing 708 may be required to contain a cryptographic hash describing the previous sub-listing 708. In some embodiments, the block chain contains a single first sub-listing 708 sometimes known as a "genesis block."

Still referring to FIG. 7, the creation of a new sub-listing 708 may be computationally expensive; for instance, the creation of a new sub-listing 708 may be designed by a "proof of work" protocol accepted by all participants in forming the immutable sequential listing 700 to take a powerful set of computing devices a certain period of time to produce. Where one sub-listing 708 takes less time for a given set of computing devices to produce the sub-listing 708 protocol may adjust the algorithm to produce the next sub-listing 708 so that it will require more steps; where one sub-listing 708 takes more time for a given set of computing devices to produce the sub-listing 708 protocol may adjust the algorithm to produce the next sub-listing 708 so that it will require fewer steps. As an example, protocol may require a new sub-listing 708 to contain a cryptographic hash describing its contents; the cryptographic hash may be required to satisfy a mathematical condition, achieved by having the sub-listing 708 contain a number, called a nonce, whose value is determined after the fact by the discovery of the hash that satisfies the mathematical condition. Continuing the example, the protocol may be able to adjust the mathematical condition so that the discovery of the hash describing a sub-listing 708 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 708 according to the protocol is known as "mining." The creation of a new sub-listing 708 may be designed by a "proof of stake" protocol as will be apparent to those skilled in the art upon reviewing the entirety of this disclosure.

Continuing to refer to FIG. 7, in some embodiments, protocol also creates an incentive to mine new sub-listings 708. The incentive may be financial; for instance, successfully mining a new sub-listing 708 may result in the person or entity that mines the sub-listing 708 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 708 Each sub-listing 708 created in immutable sequential listing 700 may contain a record or at least a posted content describing one or more addresses that receive an incentive, such as virtual currency, as the result of successfully mining the sub-listing 708.

With continued reference to FIG. 7, where two entities simultaneously create new sub-listings 708, immutable sequential listing 700 may develop a fork; protocol may determine which of the two alternate branches in the fork is the valid new portion of the immutable sequential listing 700 by evaluating, after a certain amount of time has passed, which branch is longer. "Length" may be measured according to the number of sub-listings 708 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 708 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 700 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 700.

Still referring to FIG. 7, additional data linked to at least a posted content may be incorporated in sub-listings 708 in the immutable sequential listing 700; for instance, data may be incorporated in one or more fields recognized by block chain protocols that permit a person or computer forming a at least a posted content to insert additional data in the immutable sequential listing 700. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 7, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 708 in a block chain computationally challenging; the incentive for producing sub-listings 708 may include the grant of new crypto-currency to the miners. Quantities of crypto-currency may be exchanged using at least posted content as described above.

Figure 8:
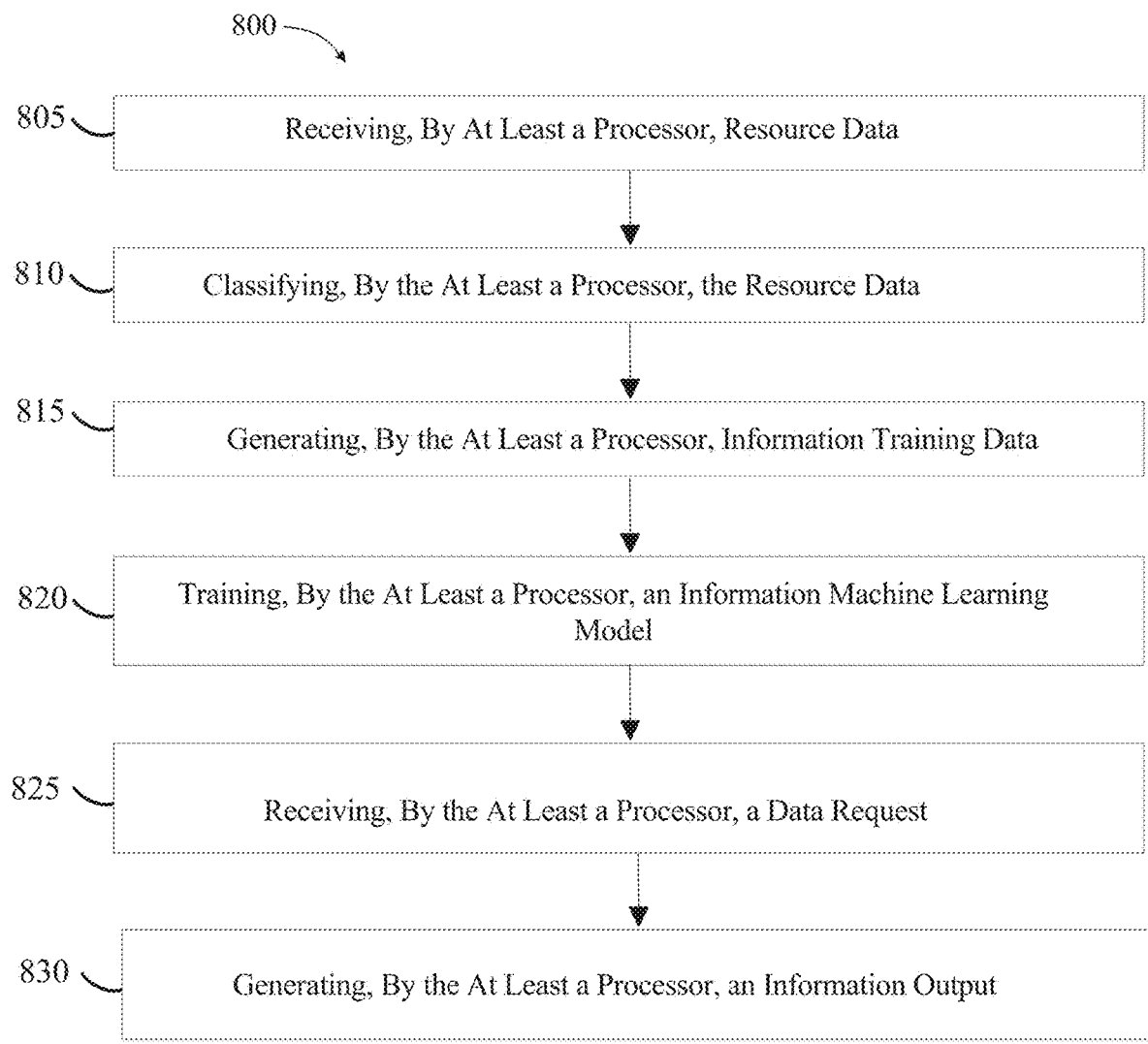
FIG. 8 is a flow diagram illustrating an exemplary embodiment of a method for personalization of machine learning models.

Referring now to FIG. 8, a method 800 for personalization of machine learning models is described. At step 805, method 800 includes receiving, by at least a processor, resource data from one or more data acquisition systems. In one or more embodiments, the resource data includes associated metadata. In one or more embodiments, the resource data is stored on an immutable sequential listing. This may be implemented with reference to FIGS. 1-8 and without limitation.

With continued reference to FIG. 8, at step 810 method 800 includes classifying, by the at least a processor, the resource data to one or more information categorizations. In one or mor embodiments, generating the information training data as a function of the classification includes receiving a plurality of training data templates and generating information training data as function of the plurality of training data templates, wherein each training data template of the plurality of training data templates is associated with each information categorization of the one or more information categorizations. This may be implemented with reference to FIGS. 1-8 and without limitation.

With continued reference to FIG. 8, at step 815 method 800 includes generating, by the at least a processor, information training data as a function of the classification. In one or more embodiments, generating, by the at least a processor, information training data includes appending the resource data to the information training data. In one or more embodiments, appending resource data to information training data may include appending resource data to one or more correlated outputs of information training data wherein information training data includes a plurality of data requests correlated to a plurality of resource data. In one or more embodiments, the information training data includes a plurality of data requests correlated to a plurality of resource data. This may be implemented with reference to FIGS. 1-8 and without limitation.

With continued reference to FIG. 8, at step 820 method 800 includes training, by the at least a processor, an information machine learning model as a function of the information training data. This may be implemented with reference to FIGS. 1-8 and without limitation.

With continued reference to FIG. 8, at step 825 method 800 includes receiving, by the at least a processor, a data request as a function of user input. This may be implemented with reference to FIGS. 1-8 and without limitation.

With continued reference to FIG. 8, at step 830 method 800 includes generating, by the at least a processor, an information output as a function of the data request and the information machine learning model. In one or more embodiments, the information output includes the associated metadata. In one or more embodiments, the information output includes at least an element of the resource data. In one or mor embodiments, the information output includes a descriptive input. In one or more embodiments, the descriptive input is received as an input into a large language model. In one or more embodiments, the resource data includes a user profile, and the information output includes the descriptive input wherein the descriptive input is generated as a function of the user profile. In one or more embodiments, descriptive input may be used as an input into large language model. In one or more embodiments, large language model may be configured to generate a user specific output as a function of the descriptive input. This may be implemented with reference to FIGS. 1-8 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
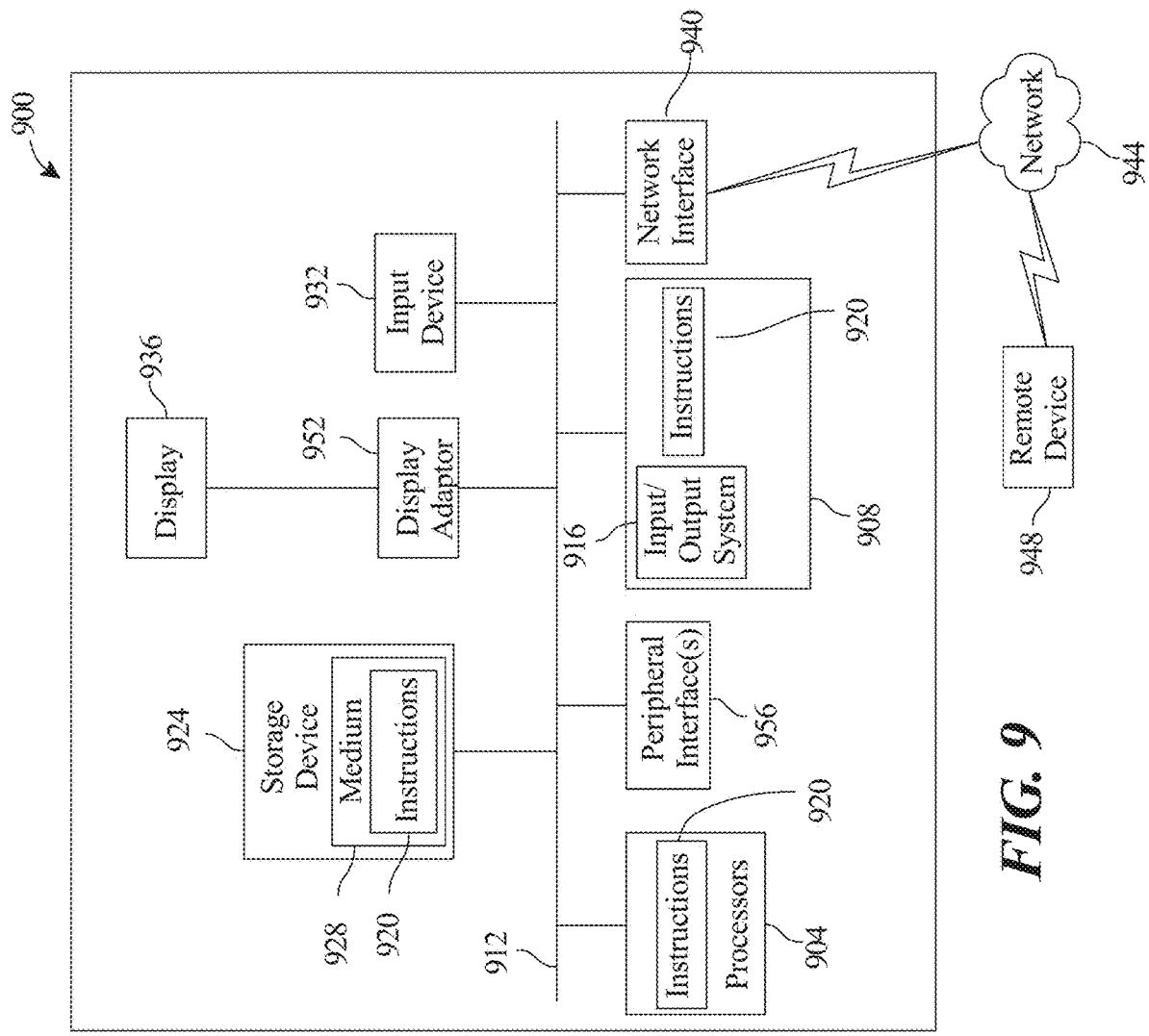
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for personalization of machine learning models, the apparatus comprising:
   at least a processor; and
   a memory communicatively connected to the at least a processor, the memory containing instructions configuring the processor to:
   receive resource data from one or more data acquisition systems, wherein the resource data comprises virtual activity data pertaining to a user, and wherein the virtual activity data comprises a virtual action made by the user;
   classify the resource data to one or more information categorizations;
   generate information training data as a function of the one or more information categorizations;
   train an information machine learning model as a function of the information training data;
   receive a data request as a function of a user input; and
   generate a personalized data request as a function of the data request and the information machine learning model; and
   generate a user specific output as a function of the personalized data request and a large language model, wherein the user specific output comprises a virtual avatar model, and wherein the virtual avatar model is configured to perform an animation based at least on the data request and a plurality of rules.

2. The apparatus of claim 1, wherein the resource data comprises associated metadata.

3. The apparatus of claim 2, wherein the information output comprises the associated metadata.

4. The apparatus of claim 1, wherein the resource data is secured on an immutable sequential listing.

5. The apparatus of claim 1, wherein generating the information training data comprises appending the resource data to one or more correlated outputs of information training data, wherein the information training data comprises a plurality of data requests correlated to a plurality of resource data.

6. The apparatus of claim 1, wherein generating the information training data as a function of the classification comprises receiving a plurality of training data templates and generating the information training data as function of the plurality of training data templates, wherein each training data template of the plurality of training data templates is associated with each information categorization of the one or more information categorizations.

7. The apparatus of claim 1, wherein the information output comprises at least an element of the resource data.

8. The apparatus of claim 1, wherein the information output comprises a descriptive input and wherein the descriptive input is received as an input into a large language model.

9. The apparatus of claim 8, wherein the processor is further configured to generate a user specific output as a function of the descriptive input and the large language model.

10. The apparatus of claim 1, wherein:
    the information output comprises a descriptive input wherein the descriptive input is generated as a function of a user profile.

11. A method for personalization of machine learning models, the method comprising:
    receiving, by at least a processor, resource data from one or more data acquisition systems, wherein the resource data comprises virtual activity data pertaining to a user, and wherein the virtual activity data comprises a virtual action made by the user;
    classifying, by the at least a processor, the resource data to one or more information categorizations;
    generating, by the at least a processor, information training data as a function of the one or more information categorizations;
    training, by the at least a processor, an information machine learning model as a function of the information training data;
    receiving, by the at least a processor, a data request as a function of user input;
    generating, by the at least a processor, a personalized data request as a function of the data request and the information machine learning model; and
    generating, by the at least a processor, a user specific output as a function of the personalized data request and a large language model, wherein the information output comprises a virtual avatar model, and wherein the virtual avatar model is configured to perform an animation based at least on the data request and a plurality of rules.

12. The method of claim 11, wherein the resource data comprises associated metadata.

13. The method of claim 12, wherein the information output comprises the associated metadata.

14. The method of claim 11, further comprising securing, by the at least a processor, the resource data on an immutable sequential listing.

15. The method of claim 11, wherein generating, by the at least a processor, the information training data comprises appending the resource data to one or more correlated outputs of information training data, wherein the information training data comprises a plurality of data requests correlated to a plurality of resource data.

16. The method of claim 11, wherein the information training data comprises a plurality of data requests correlated to a plurality of resource data.

17. The method of claim 11, wherein generating, by the at least a processor, the information training data as a function of the classification comprises receiving a plurality of training data templates and generating information training data as function of the plurality of training data templates, wherein each training data template of the plurality of training data templates is associated with each information categorization of the one or more information categorizations.

18. The method of claim 11, wherein the information output comprises a descriptive input and wherein the descriptive input is received as an input into a large language model.

19. The method of claim 18, further comprising generating, by the at least a processor, a user specific output as a function of the large language model.

20. The method of claim 11, wherein:
    the information output comprises a descriptive input wherein the descriptive input is generated as a function of a user profile.

\* \* \* \* \*